US008853566B2

(12) United States Patent
Jaeger

(10) Patent No.: US 8,853,566 B2
(45) Date of Patent: *Oct. 7, 2014

(54) BIN WEIGHING SYSTEM

(75) Inventor: Mark H. Jaeger, Mapleton, MN (US)

(73) Assignee: Herdstar, LLC, Mankato, MN (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/338,610

(22) Filed: Dec. 28, 2011

(65) Prior Publication Data

US 2012/0090901 A1 Apr. 19, 2012

Related U.S. Application Data

(63) Continuation-in-part of application No. 13/157,483, filed on Jun. 10, 2011, now Pat. No. 8,581,122, which is a continuation of application No. 12/109,841, filed on Apr. 25, 2008, now Pat. No. 7,980,129.

(60) Provisional application No. 61/427,593, filed on Dec. 28, 2010, provisional application No. 60/913,961, filed on Apr. 25, 2007.

(51) Int. Cl.
G01G 19/52 (2006.01)
G01F 23/20 (2006.01)
G01G 21/23 (2006.01)
G01F 23/00 (2006.01)

(52) U.S. Cl.
CPC .............. *G01F 23/20* (2013.01); *G01G 21/23* (2013.01)
USPC .......................................... 177/132; 73/290 V

(58) Field of Classification Search
USPC ................................. 177/132, 146; 73/290 V
See application file for complete search history.

(56) References Cited

U.S. PATENT DOCUMENTS

| 3,376,537 | A | * | 4/1968 | Pugnaire ........................... 338/5 |
| 4,004,647 | A | * | 1/1977 | Forst et al. ...................... 177/128 |
| 4,044,920 | A | | 8/1977 | Swartzendruber |
| 4,530,245 | A | | 7/1985 | Jacobson |
| 4,738,135 | A | | 4/1988 | Cadwell et al. |
| 5,490,479 | A | | 2/1996 | Shalev |
| 5,747,747 | A | * | 5/1998 | Cadou et al. ................... 177/145 |
| 5,764,522 | A | | 6/1998 | Shalev |
| 5,770,823 | A | * | 6/1998 | Piroozmandi ..................... 177/1 |
| 6,981,649 | B2 | | 1/2006 | Jaeger et al. |
| 2007/0000320 | A1 | | 1/2007 | Jaeger et al. |

OTHER PUBLICATIONS

Thermo Electron Corporation, Ramsey C-Level Continuous Level Indicator Low-Cost Continuous Level Measurement for Bins and Vessels, Product Specifications Catalog, 2005, Thermo Electron Corporation.

Hog Slat, Feeding Systems Catalog, Dec. 2005, p. 25.

(Continued)

*Primary Examiner* — Randy W Gibson
(74) *Attorney, Agent, or Firm* — Moore & Hansen, PLLC

(57) ABSTRACT

A bin monitoring system functions both as a device for lifting the bin and as a weighing system for monitoring or measuring the level of feed or other product in a bin. Various embodiments and methods of retrofitting the bin monitoring system to existing bins are provided. Further, the accuracy provided by various embodiments enables one to accurately predict when the bin will be empty. Thus, a feed mill, for example, can be aware of anticipated needs days in advance, allowing the feed mill to better optimize its scheduling and deliveries.

37 Claims, 18 Drawing Sheets

(56) References Cited

OTHER PUBLICATIONS

Hog Slat, INTaK AD-LIB Lactation Feeding System Catalog, Fall 2005, 2 pgs.

Avery Weigh-Tronix, Scale Systems A Better Weigh to Measure Farming Performance Catalog, Feb. 2004.

HerdStar, MicroZone Automatic Lamp and Mat Controller, Novonix Corporation: A Herdstar Company, Jul. 15, 2006, National Hog Farmer the Pork Business Authority.

Automated Production Systems, INTEGRA Integrated Management System Micro-Meter Catalog, Apr. 1, 2004.

Automated Production Systems, INTEGRA Integrated Management System Feed-Link Catalog, Apr. 1, 2006.

Phason—Standalone software—Bin Ware, Bin Ware Control and monitor your bin weighing system from a central computer, 2005, 2 pgs., www.phason.ca/binware.htm.

Phason—OMNI—OMNI—Feed's Herd Information System, Herd Information System OMNI—Feed's integrated herd management system, 2005, 2 pgs., www.phason.ca/herdinf.htm.

Phason—OMNI—OMNI—Feed's Feed Mill Informative System, Feed Mill Information System OMNI—Feed's comprehensive feed management system, 2005, 2 pgs., www.phason.ca/feedmill.htm.

United States Patent and Trademark Office, Complete Prosecution History of U.S. Appl. No. 12/109,841, now U.S. Patent No. 7,980,129.

* cited by examiner

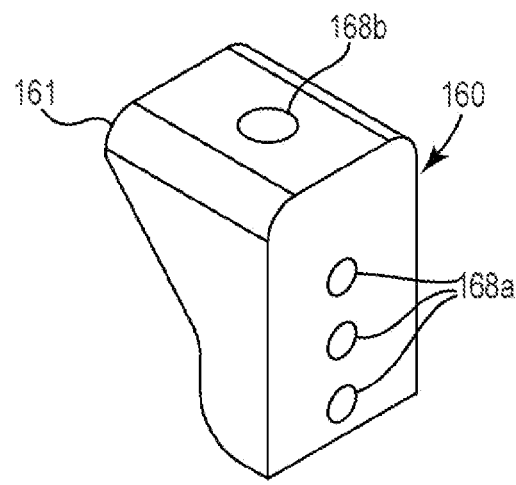
Fig. 15A
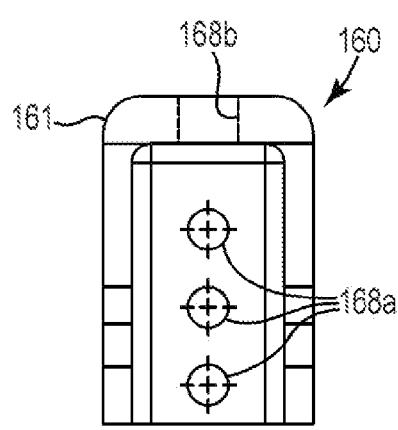 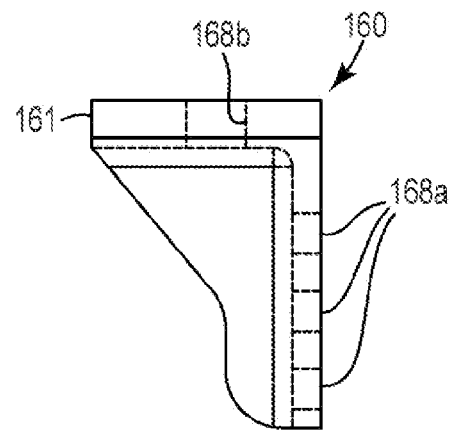
Fig. 15B          Fig. 15C
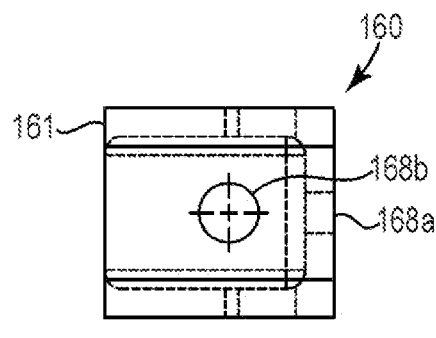 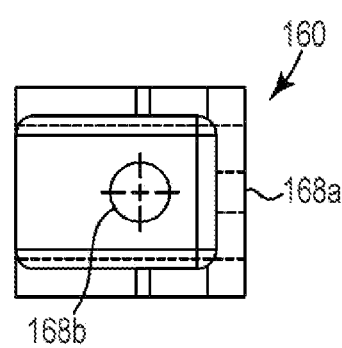
Fig. 15D          Fig. 15E

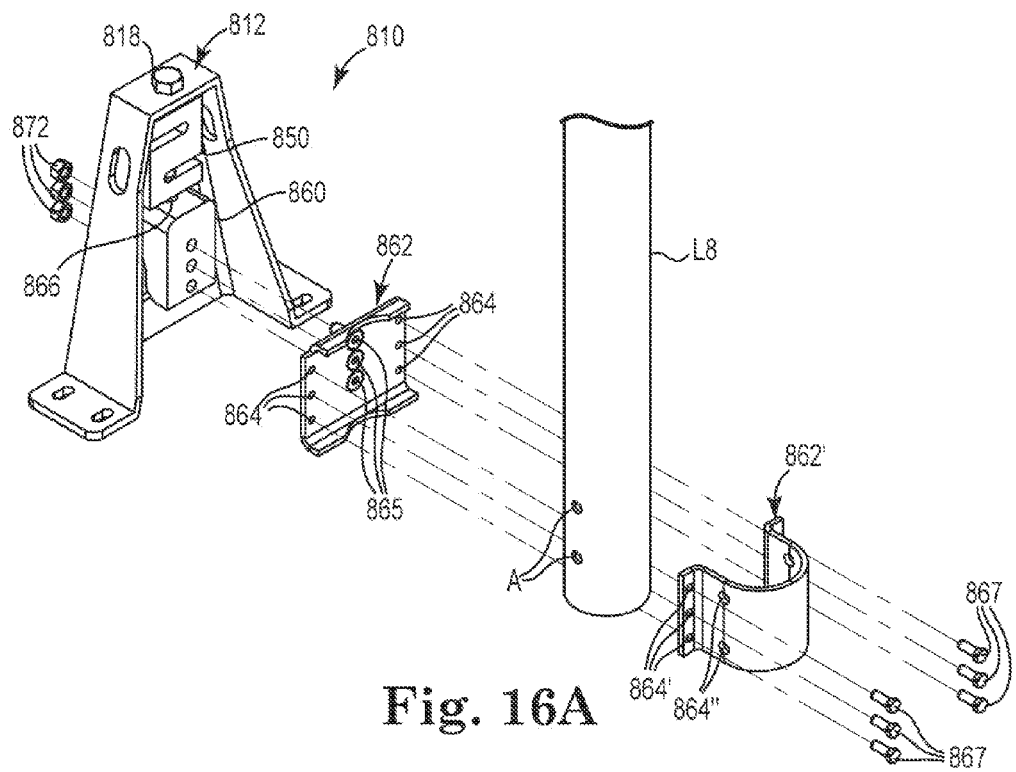
Fig. 16A
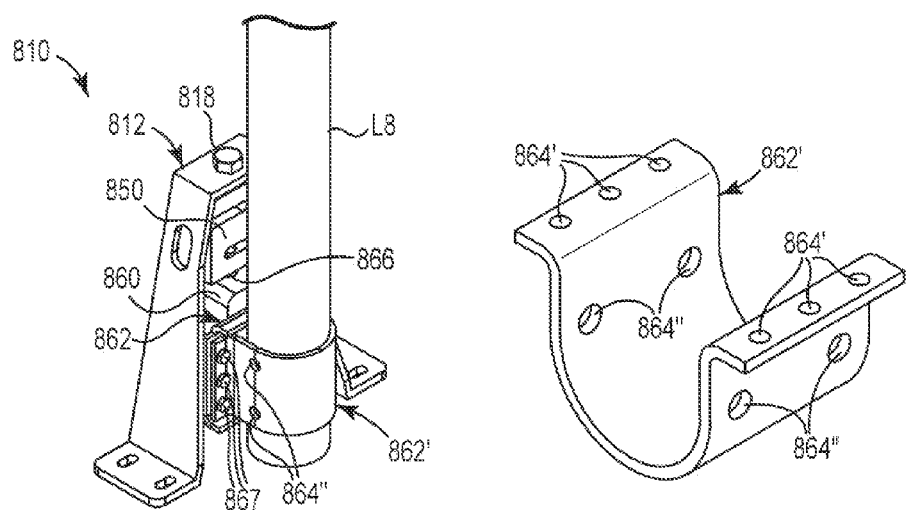
Fig. 16B
Fig. 16C

BIN WEIGHING SYSTEM

RELATED APPLICATIONS

This application claims the benefit of U.S. Provisional Application No. 61/427,593 filed on Dec. 28, 2010; this application is also a continuation-in-part of U.S. application Ser. No. 13/157,483 filed on Jun. 10, 2011 now U.S. Pat. No. 8,581,122, which is a continuation of U.S. application Ser. No. 12/109,841, filed on Apr. 25, 2008, now U.S. Pat. No. 7,980,129, which claims the benefit of U.S. Provisional Application No. 60/913,961, filed on Apr. 25, 2007, the disclosures of which are hereby incorporated by reference in their entirety.

TECHNICAL BACKGROUND

The disclosure relates generally to feed bin monitors or the like and methods of installing feed bin monitors. More particularly, the disclosure relates to feed bin monitors having a load cell that is positioned above a bottom of a bin leg.

BACKGROUND

Many animal finishing facilities have bulk bins and automated feed delivery systems. In theory, these bins and delivery systems are intended to assure an uninterrupted flow of feed to the feeder. In reality, however, various known delivery systems result in varying disruptions of feed availability, which may have very serious consequences. For example, out-of-feed events can cause animal health problems, such as ulcers, particularly in pigs. Other potential health problems include, for example, cannibalistic tail biting and Hemorrhagic Bowel Syndrome, which is often fatal to the animal. Moreover, it is believed that even one out-of-feed event can have a prolonged negative effect on weight gain. Paid dividends can be directly affected as a result.

Out-of-feed events can be caused by a variety of causes. One notable cause is human error. Human errors are generally associated with empty bins, which occur when feed is not ordered, prepared, and delivered in a timely manner. Other causes of out-of-feed events include, for example, bridging and rat-holing of the feed. In these cases, the feed still remains in the bin, but does not flow to the delivery or auger system. As a result, even though feed is present in the bin, it is not delivered to the animals. When this occurs, the feed delivery system may shut down due to its extended run timers. No feed is then delivered until the feed delivery system is manually reset. If producers are not closely monitoring the feed delivery system, animals can be without feed for extended periods of time. While out-of-feed events can be prevented, in practice, they occur quite often.

One method of preventing out-of-feed events involves personally checking each bin by climbing up a ladder to the top of the bin and visually noting and monitoring the level of the bin. This method is labor-intensive and can be quite dangerous, especially in frigid, icy, or wet weather. To save time and avoid safety risks associated with climbing to the top of the bin, some workers have resorted to physically hitting the bin to estimate the level of the feed by listening to the sound reverberation. This method, however, does not provide the producer with very accurate information. It is also still labor-intensive because the worker has to personally check each individual bin. Further, as compared to the past, it is now more common for farms to be isolated from the workers. As a result, it takes more effort to check and monitor the feed systems. Therefore, the feed bins often are not checked frequently enough to prevent out-of-feed events because it takes too much time to check the bins, and, additionally, rush orders are often not fulfilled quickly enough.

Accordingly, electronic monitors have been devised to monitor feed levels. These known electronic monitors are equipped with compression load cells positioned on a concrete slab underneath the bin legs. The load cells measure the amount of the feed in the bin and are able to track the level and the changes in the feed weight, for example, from deliveries and consumption. Some of these known electronic monitors can make feed level data available to producers by telephone. Many producers choose not to implement these known systems, however, because they are costly and are difficult to retrofit to existing bins. Separate jacks or cranes are required so that the bin legs can be raised approximately 3-4 inches off of the concrete slab. Raising the bin disrupts the connections between the bins and the conveyor pipes that carry the feed from the bin to the feeding point. Known electronic feed bin monitors can also be unreliable because they are often susceptible to adverse affects on the accuracy of their measurements due to ice and foreign material under the supporting mechanisms. These supporting mechanisms include foot pads that are bolted to the concrete slab beneath the bin. Bolting the foot pads to the concrete slab introduces torques that can twist the load cell system enough to produce false readings at times.

Some other known systems are sonar or ultrasound based. One drawback of such systems is that they only report a feed level, not weight. As a result, these systems have difficulty maintaining accuracy when, for example, there is bridging or rat-holing of feed, there are significant changes in feed density, or there are temperature variations. All of these events can alter the correlation between feed level and the true amount or weight of feed. Known sonar or ultrasound based systems can also only provide level monitoring. Thus, they cannot accurately measure feed delivered or consumed by weight. The present invention addresses problems associated with the related art.

SUMMARY OF THE DISCLOSURE

According to various example embodiments, a bin monitoring system functions both as a device for lifting the bin and as a weighing system for monitoring or measuring the level of feed in a feed bin. Various embodiments having a load cell and methods of retrofitting the bin monitoring system to existing bins are provided. Further, the accuracy provided by various embodiments enables one to accurately predict when the feed bin will be empty. Thus, the feed mill can be aware of anticipated needs days in advance, allowing the feed mill to better optimize its scheduling and deliveries.

One embodiment is directed to a feed bin monitoring system that has a suspended load cell in tension that accurately measures the amount of feed going into and out of a feed bin having bin legs that support the bin above a foundation. The feed bin monitoring system of this embodiment can quickly detect if no feed is being consumed by the animals due to, for example, bridging of the feed in the bin. The feed bin monitoring system includes a frame configured to be securable to the foundation. A load cell is joined to the frame and is configured to measure a weight of the bin. Various preferred embodiments include a lifting mechanism arranged to selectively lift the bin leg, thus applying the load to the load cell. Another aspect of the invention is directed to a method of monitoring an amount of feed in a feed bin having a plurality of bin legs by operatively connecting at least one feed bin monitor to each of the bin legs and transmitting data collected from the load cell to a display device.

Another aspect of this invention is directed to a method of installing a bin monitoring system, such as described above, to a leg of a feed bin. The method generally includes the steps of securing at least one bin monitoring system to one or more of the bin legs and using the bin monitoring system to support the bin legs preferably no more than approximately 0.5 inches above the ground, thus facilitating retrofitting of existing bins.

Various embodiments may provide certain advantages. For instance, feed levels can be monitored easily and accurately so that out-of-feed events can be significantly reduced. Also, feeding animals with feed bins equipped with automatic bin monitoring systems reduces the need for expedited orders and allows feed producers to predict production needs in advance. Feed throughput may be improved, and feed transportation costs may be reduced. Further, the bin monitoring systems described herein can be retrofitted to existing bins easily and inexpensively, thereby reducing implementation costs.

Additional objects, advantages, and features will become apparent from the following description and the claims that follow, considered in conjunction with the accompanying drawings.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 15A is a perspective view of the mechanical connector or channel block 160, which is the same as preferred channel blocks 260, 360, 460, 460', 660, 760 and 860.

FIG. 15B is a rear view of the channel block 160 of FIG. 15A.

FIG. 15C is a side view of the channel block 160 of FIGS. 15A-15B.

FIG. 15D is a top view of the channel block 160 of FIGS. 15A-15C.

FIG. 15E is a bottom view of the channel block 160 of FIGS. 15A-15D.

FIG. 16A is a perspective, partially-exploded view of an alternative preferred bin monitoring system 812 having first and second brackets 862, 862' for securing a bin leg L8 to mechanical connector 860.

FIG. 16B is a perspective view of the bin monitoring system 810 of FIG. 16A partially secured to bin leg L8 (with bolts secured within apertures 864'' and A removed for clarity).

FIG. 16C is a perspective view of preferred second bracket 862' of the bin monitoring system 810 of FIGS. 16A-16B.

DESCRIPTION OF THE PREFERRED EMBODIMENTS

Figure 1A:
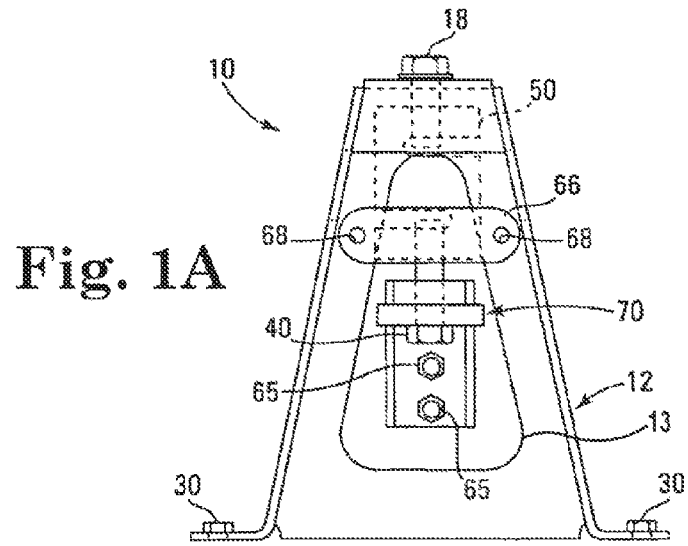
FIG. 1A is a front plan view of an embodiment of a bin monitoring system 10.

The following description of various embodiments implemented in the context of monitoring the volume or weight of feed bins and installing such monitoring systems is to be construed by way of illustration rather than limitation. This description is not intended to limit the invention or its applications or uses. For example, while various embodiments are described as being implemented in this context, it will be appreciated that the principles of the disclosure are applicable to other environments, as will be apparent to one of ordinary skill in the art.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Various embodiments of the bin monitoring system are illustrated in FIGS. 1A-16C. Referring now in particular to FIGS. 1A-3C and 6, a bin monitoring system 10 includes a frame 12. In various preferred embodiments, the frame 12 is A-shaped and has an aperture or opening 13, a top 14 and two legs or supports 20a and 20b extending diagonally downward from the top 14. In the illustrated embodiments, each support 20a and 20b has a respective base or flange 24a and 24b with at least one respective flange aperture 28a and 28b for anchoring the frame 12 to a foundation such as a concrete slab C, as most bins are installed on concrete slabs. The top 14 includes a bolt aperture 16 that receives a bolt 18 for securing the frame 12 to the top of a load cell 50. In preferred embodiments, the frame 12 can be constructed of fabricated iron. Alternatively, the frame can be constructed of fabricated channel iron or the like.

In some embodiments, the load cell 50 is implemented as an S-type load cell for measuring the tension or changing weight of a bin B. The bin monitoring system 10 incorporates the load cell 50 to measure the weight and changes of weight of the bin B. An example implementation of the load cell 50 is disclosed in U.S. patent application Ser. No. 11/422,910 of Jaeger et al., the teachings of which are herein incorporated by reference in their entirety. In some embodiments, the load cell 50 includes an electrical connection 52 having a wire cord that passes through an aperture 22 in one of the supports 20a and 20b to a transmitter (not shown) such that data collected from the load cell 50 can be accessed via a remote location such as, for example, by a wired, wireless, or mobile telephone or using a network such as the Internet.

It is further contemplated that the bin monitoring systems described herein may be an element of a larger system in which the data transmitted may be compiled with other data, such as animal weights, so that multiple variables can be monitored and tracked in one central location. Such a larger system can also include, for example, a component for generating reports, such as a bin status report, a configuration report, an alarm settings report, a feed usage report, and a bin summary report. The bin status report may illustrate an image of a feed bin showing the current weight, alarm settings, and alarm conditions. The configuration report may list the configuration for the setup menu, interface menu, and computer port. The alarm settings report may list the alarm settings for each indicator. The feed usage report may list daily feed usage sorted by date and the total feed delivered for a selected date range. The bin summary report may list the current bin weights and any alarm conditions for the feed bins.

Figure 1B:
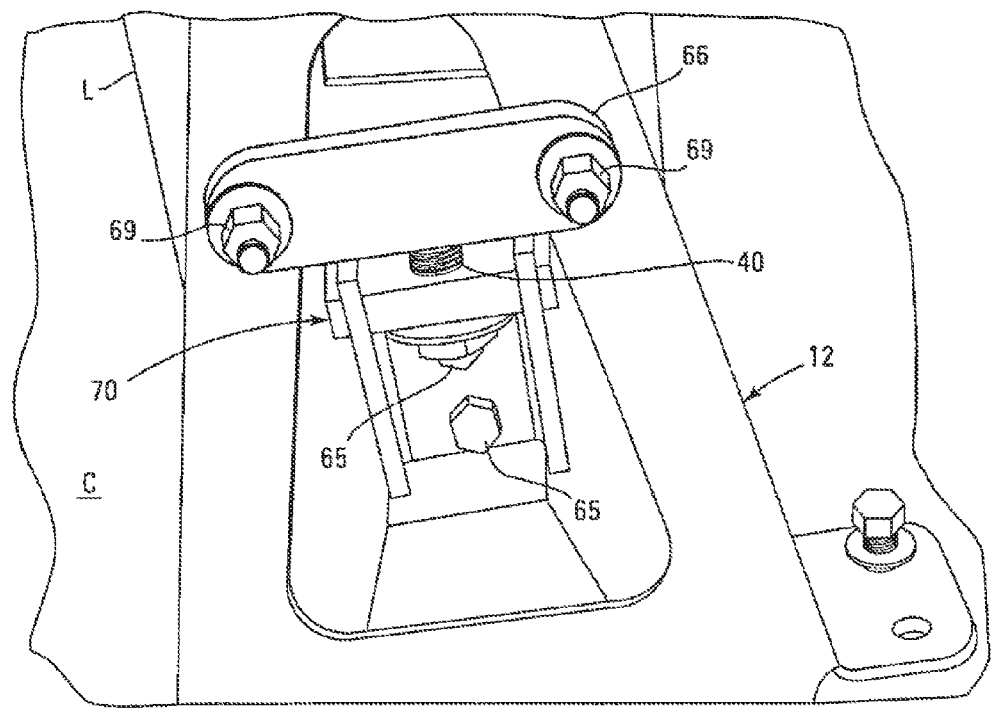
FIG. 1B is a front view of the bin monitoring system 10 of FIG. 1A, wherein the bin monitoring system 10 is operatively attached to a bin leg L.
Figure 1C:
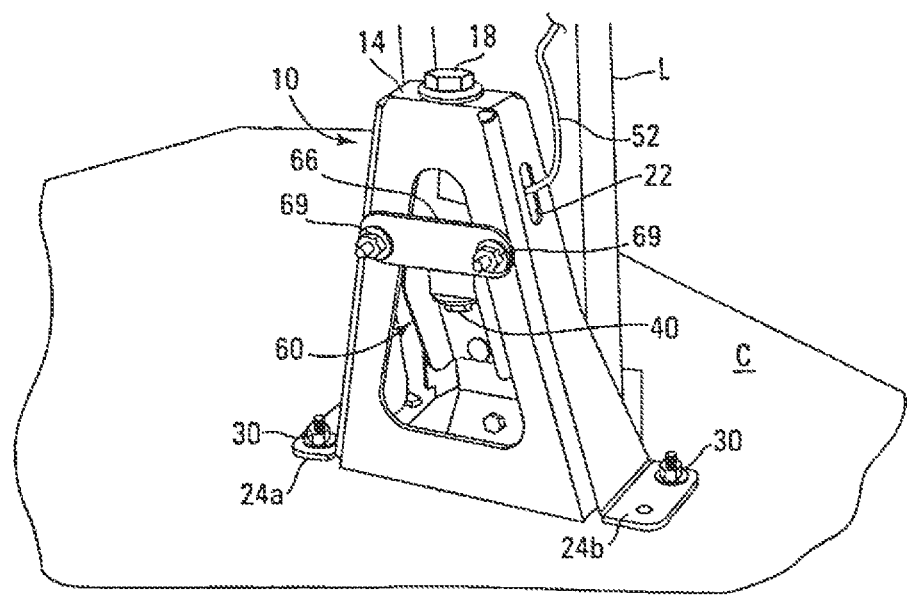
FIG. 1C is an enlarged, partial, perspective view of the bin monitoring system 10 illustrated in FIGS. 1A-1B.
Figure 1D:
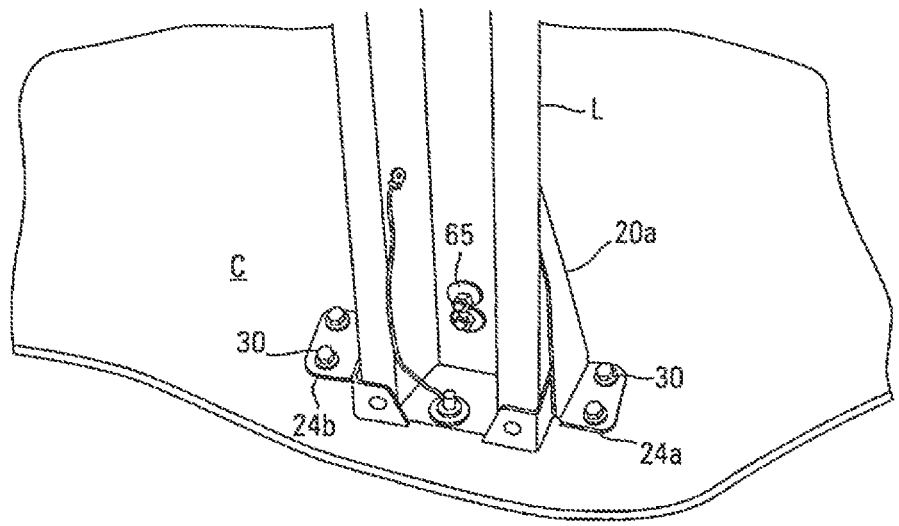
FIG. 1D is a rear view of the bin monitoring system 10 of FIGS. 1A-1C operatively connected to the bin leg L.
Figure 2A:
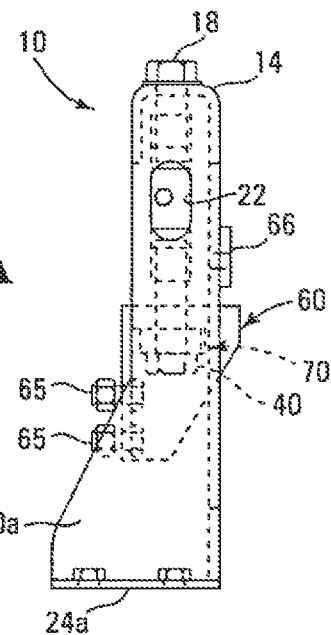
FIG. 2A is a side view of the bin monitoring system 10 of FIG. 1A-1D.
Figure 2B:
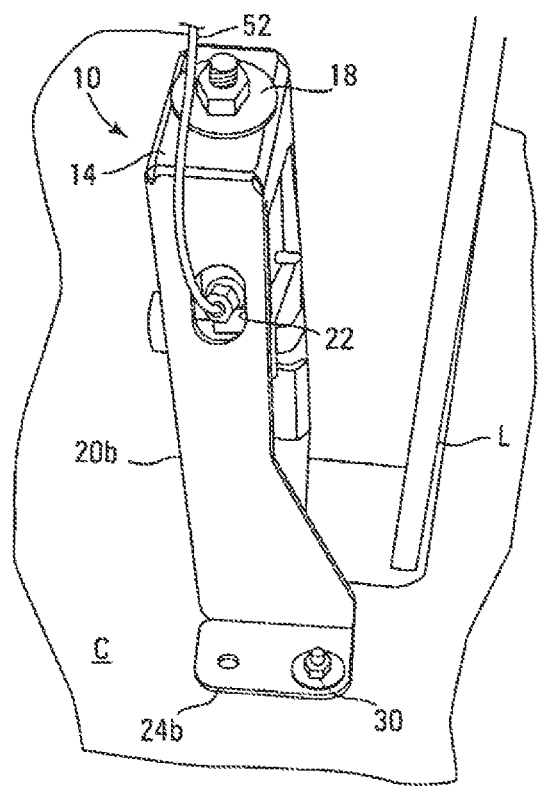
FIG. 2B is another side view of the bin monitoring system 10 of FIGS. 1A-1D, wherein the bin monitoring system 10 is operatively attached to the bin leg L.
Figure 3A:
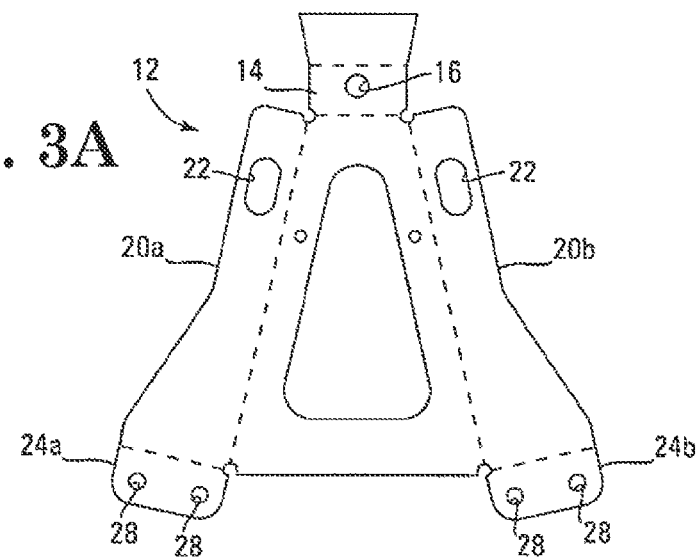
FIG. 3A is a front view of a frame of the bin monitoring system 10 of FIG. 1A illustrating preferred fold lines of the preferred frame 12.
Figure 3B:
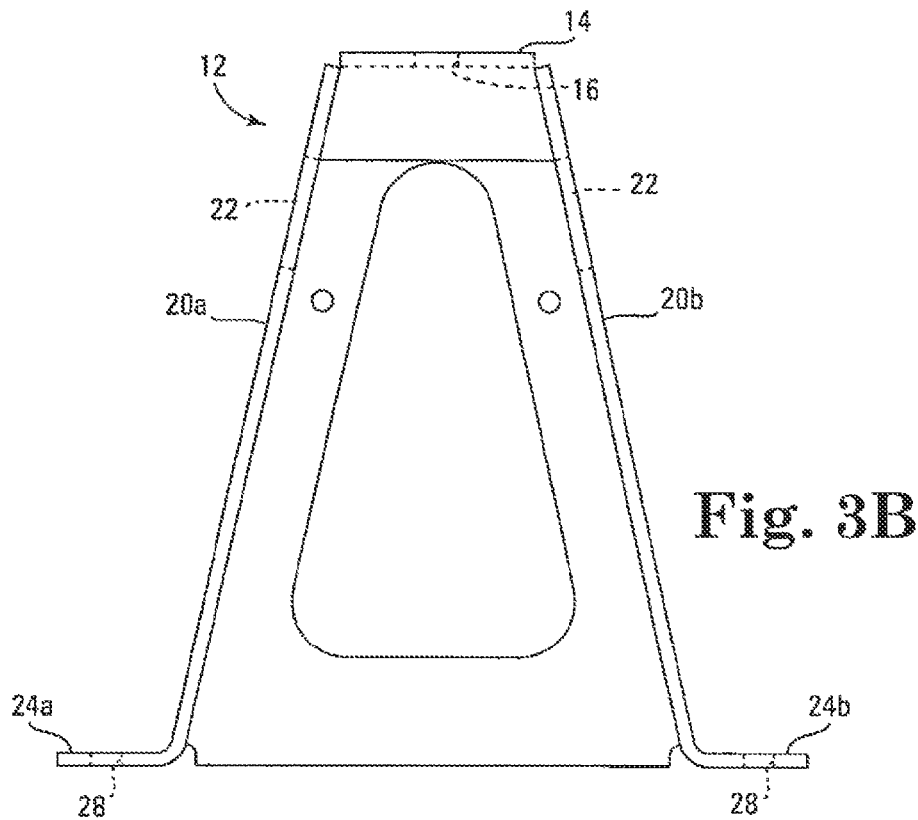
FIG. 3B is a plan view of the folded frame 12 of FIG. 3A.
Figure 3C:
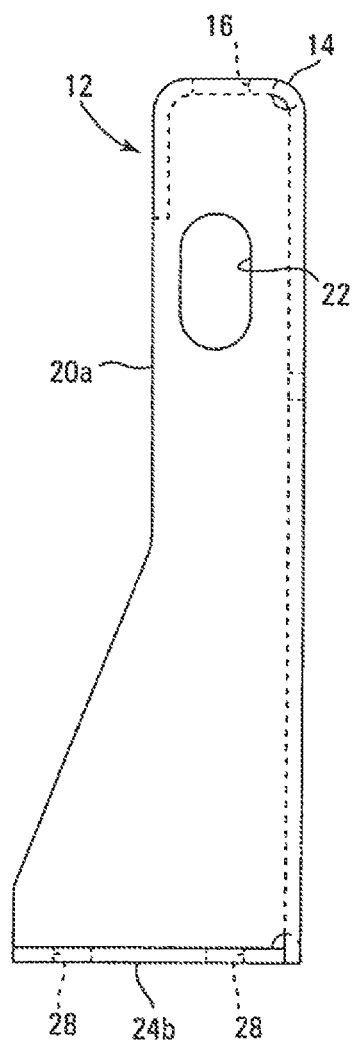
FIG. 3C is a side view of the frame 12 of FIGS. 3A-3B.
Figure 4A:
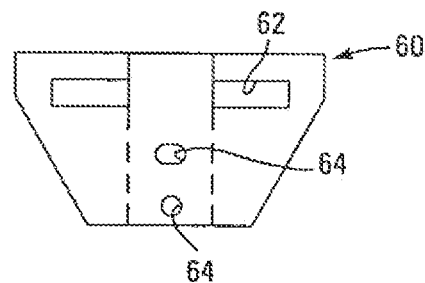
FIG. 4A is a plan view of a channel bracket 60 of the bin monitoring system 10 of FIG. 1A.
Figure 4B:
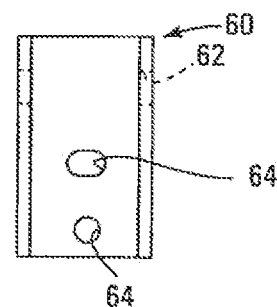
FIG. 4B is front view of the channel bracket 60 of FIG. 4A illustrating preferred fold lines.
Figure 4C:
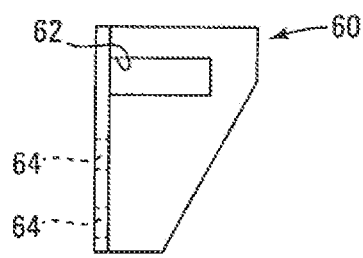
FIG. 4C is a side view of the folded channel bracket 60 of FIG. 4A-4B.
Figure 7:
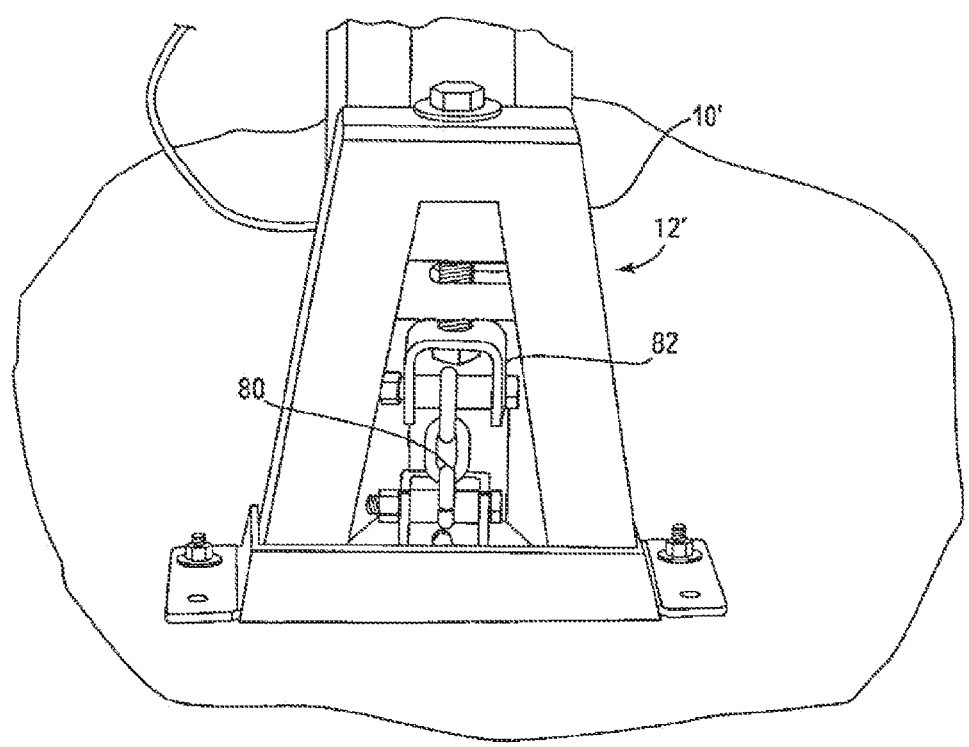
FIG. 7 illustrates an alternate embodiment of a bin monitoring system 10' in which the channel bracket 60 of FIG. 1A is replaced with a chain link suspension or mechanical connector 80 attached to a clevis 82.

Now also referring to FIGS. 4A-C, the bin monitoring system 10 additionally includes a mechanical connector, in this case a channel bracket 60, that is used to connect the bin monitoring system 10 to a leg L of the bin B. The channel bracket 60 may be generally U-shaped, being deeper at the top than at the bottom, to correspond to the shape of the bin leg L. In some embodiments, the bin monitoring system 10 includes a limiting mechanism 66 to restrict the upward movement of the channel bracket 60. The limiting mechanism 66 prevents the bin B from lifting and blowing over when, for example, there is a gust of wind and the bin B is empty. As shown, the limiting mechanism 66 may be a stop strap having bolt apertures 68 for use with a bolt 69 to secure the strap to the frame 12 as shown in FIGS. 1A-1C. The channel bracket 60 further includes a slot 62 for receiving and in some instances, supporting a load block 70 and is deep enough such that when the channel bracket 60 is bolted to the bin leg L and the frame 12 is secured to the concrete slab C, the channel bracket 60 extends beyond the stop strap 66, allowing it to contact and be restricted by the stop strap 66 when the bin B is lifted too high. This configuration is also illustrated in FIG. 2A. In alternative embodiments, the channel bracket 60 may be replaced with a alternate mechanical connector, such as a chain link suspension 80 attached to a clevis 82, as shown in FIG. 7. It will be understood that other mechanical connectors can be used.

Figure 5A:
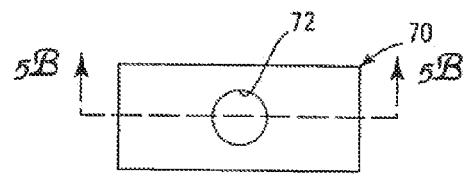
FIG. 5A is a top view of a load block 70 of the bin monitoring system 10 of FIG. 1A.
Figure 5B:
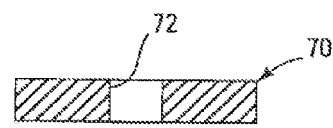
FIG. 5B is a cross-sectional, side view of the load block 70 of FIG. 5A.
Figure 6:
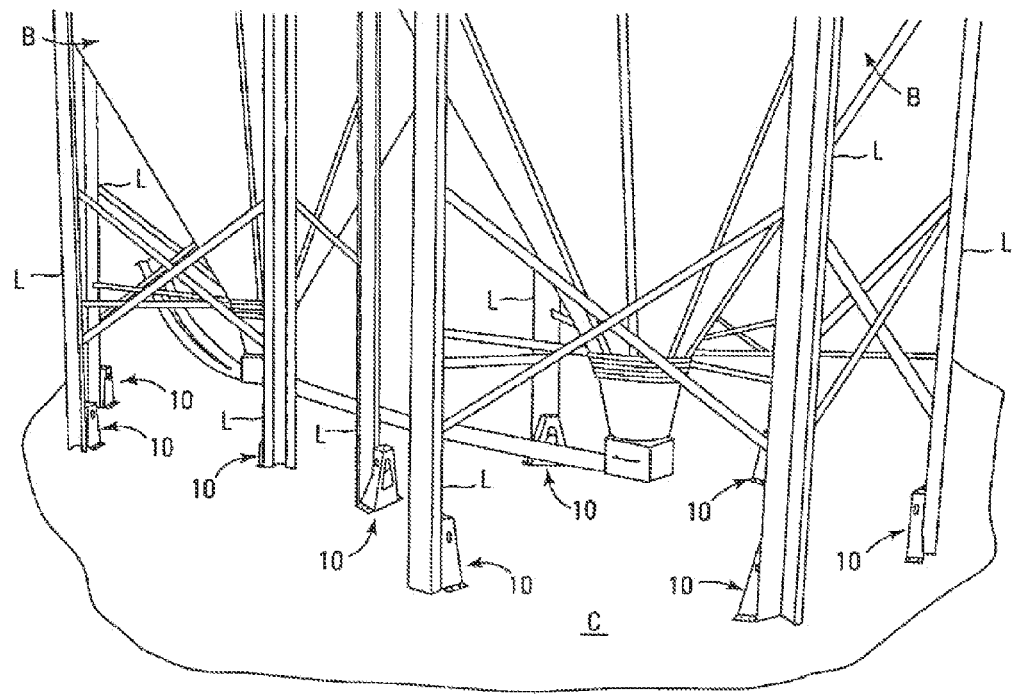
FIG. 6 is a view of a bin monitoring system 10 attached to each leg L of two adjacent bins B according to an alternate embodiment.

Now further referring to FIGS. 5A-5B, as previously mentioned, the bin monitoring system 10 preferably further includes the load block 70, which is received within the slot 62 of the channel bracket 60 and is supported by the channel bracket 60 until the bracket 60 is elevated with respect to the frame. The load block 70 is illustrated in FIGS. 5A-5B as having a bolt aperture 72. The load block 70 is placed in the slot 62 of the channel bracket 60. A threaded bolt 65 is then placed through a bolt aperture 72 of the load block 70 and threaded into the load cell 50. The load block 70 can move within the slot 62. This configuration allows for some misalignment of the channel bracket 60.

A typical feed bin has 4, 6, or 8 generally U-shaped legs. The bin monitoring system 10 may be placed alongside each leg L and bolted to the concrete slab C with an anchor bolt 30 through two of the flange apertures 28a and 28b. Two more bolts 65 may be pressed through the bolt holes 64 of the channel bracket 60 to connect the bin monitoring system 10 to the bin leg L.

As described above, the bin monitoring system 10 includes the threaded bolt 18 or the like, which secures the load cell 50 to the frame 12. According to various embodiments, the bolt 18 also serves as a jack to lift and support the load cell 50 when the load cell 50 is suspended off of the concrete slab C. In some embodiments, the bin monitoring system 10 supports the bin B no higher than about 0.75 inches above the foundation, preferably no higher than about 0.5 inches above the concrete slab C. Because installing the bin monitoring system 10 does not require the bin B to be significantly lifted, existing bins may be retrofitted without having to empty the bin or disconnect flex augers and associated piping.

To install the bin monitoring system 10 according to one example method, the load cell 50, frame 12, and limiting mechanism 66 are operatively assembled. The footpads are then disconnected from the bin legs L. Next, two 0.5 inch holes are drilled into the bin legs L for the channel bracket 60. In the next step, the channel bracket 60 is first mounted adjacent the side of the leg L such that any space in between the channel bracket 60 and the leg L is reduced. Once the channel bracket 60 is attached adjacent the leg L, the frame 12 is aligned to the bin leg L and is secured with concrete anchor bolts 30. The channel bracket 60 is connected to a threaded load cell 50 by a threaded bolt 40 that can also function as a mechanism to lift and support the bin leg L. As the bolt 40 is rotated, e.g., seven times, the load cell 50 is moved upwards and correspondingly moves the bin leg L upwards. In the next step, a summing box or the transmitter (not shown) is mounted to the bin B and is operatively connected to the load cell(s) 50. Next, the summing box can be wired to the bin monitoring system 10. Next, wiring to the load cell 50 is secured to the bin support frame, e.g., using one or more cable ties. The bin monitoring system 10 is then preferably connected to the on-site network to enable communication with a remote monitoring system. Next, preferably three of the bin legs L are preferably electrically grounded above each frame using the anchor bolts.

Figure 8A:
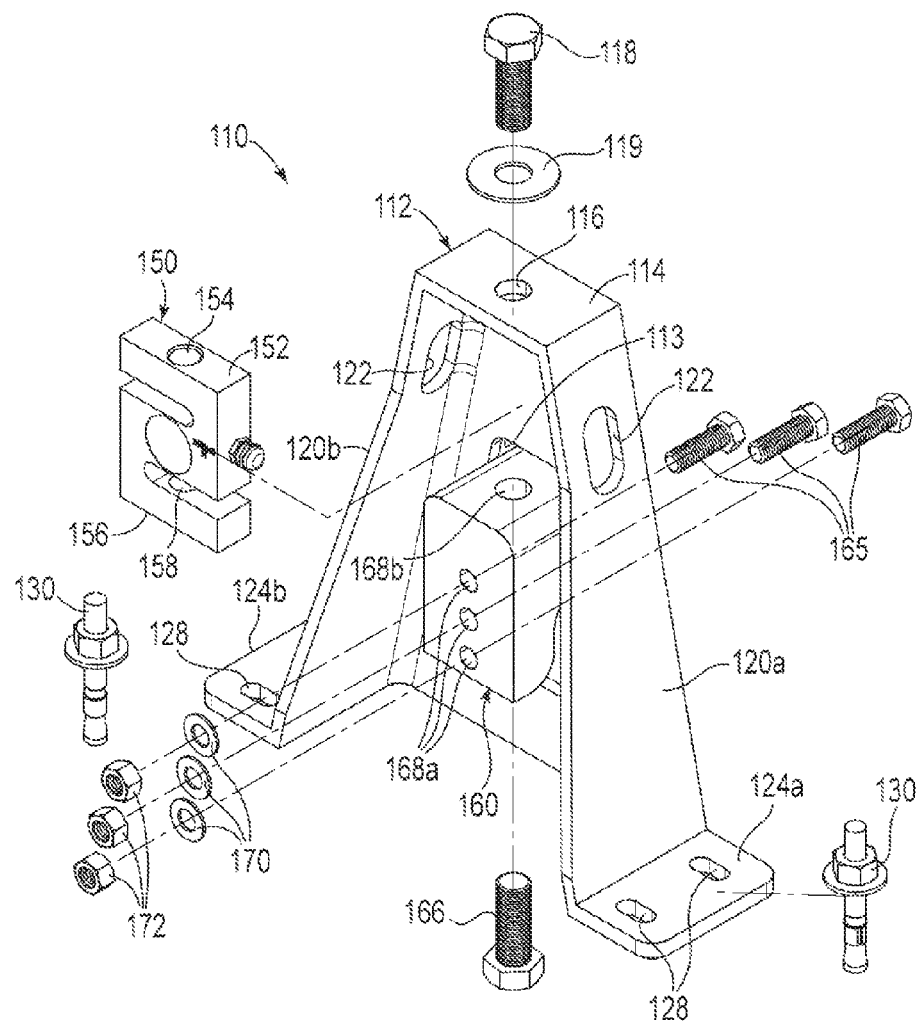
FIG. 8A is an alternate bin monitoring system 110 having a channel block 160 to which the bin leg L1 is secured.
Figure 8B:
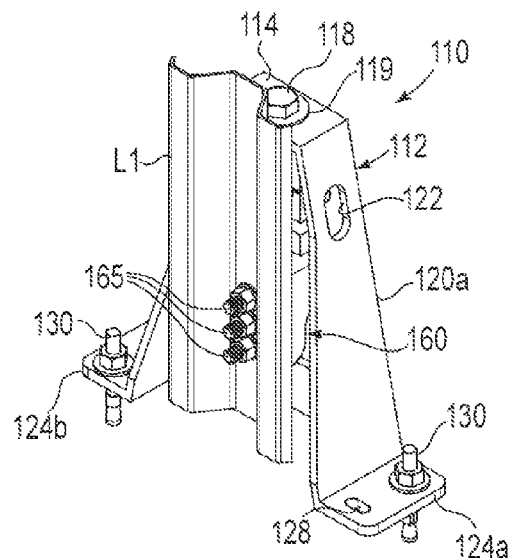
FIG. 8B is a perspective view of the bin monitoring system 110 of FIG. 8A, the bin monitoring system secured to bin leg L1.

Now also referring to an alternate bin monitoring system 110. Bin monitoring system 110 is preferred for bin legs L1 that are generally shaped as illustrated in FIG. 8B. Preferably, one bin monitoring system 110 is secured to each bin leg L1. Bin monitoring system 110 preferably includes a generally A-shaped frame 112, similar to previous embodiments discussed herein. The preferred frame 112 includes a centrally located opening or aperture 113, a top 114 having an aperture 116 and two supports 120a, 120b extending downwardly and outwardly from the top 114. The frame 112 further includes a base consisting of flanges 124a, 124b, each flange 124a, 124b having at least one aperture 128 for receiving an anchor bolt 130 for securing the frame 112 to a concrete slab C or other foundation.

The bin monitoring system 110 further includes a load cell 150, preferably an S-type load cell, but it will be understood that other types of load cells can be used and are within the spirit and scope of the invention. The load cell 150 includes a first or top end 152 having a top threaded aperture 154 and a bottom or second end 156 having a bottom threaded aperture 158. To secure the load cell 150 to the frame 112, a bolt 118 can be inserted through the aperture 116 in the top 114 of the frame 112 and through the top threaded aperture 154 of the load cell 150. As desired, a washer 119 or the like can be provided to reinforce the top aperture 116 of the frame 112. Each support preferably includes an aperture 122 for optionally threading electrical wiring for the load cell 150 (see also, FIG. 1C and related disclosure).

Within the aperture 113, a mechanical connector or channel block 160 can be positioned. The channel block 160 illustrated is configured and arranged similarly to mechanical connectors 260, 360, 460, 460', 660, 760 and 860, disclosed herein. The preferred channel block includes an extension 161 that generally limits the upward movement of the channel block 160 within the frame aperture 113. The preferred channel block includes at least one side aperture 168a extending through the channel block 160 and a top aperture 168b. The channel block 160 is preferably suspended from the bottom 156 of the load cell 150 with a bolt 166 secured within the bottom threaded aperture 158 of the load cell 150 and a top aperture 168b of the channel block 160. Therefore, when bolts 165 are secured through bin leg L1 apertures and into the corresponding bolt apertures 168a of the channel block 160, the load of the bin leg L1, is transferred to the load cell 150 proximate the bottom 156. Similarly to previously discuss embodiments, the channel block 160 and the bin leg L1 can be raised or lowered by rotating bolts 118 or 166.

Figure 9A:
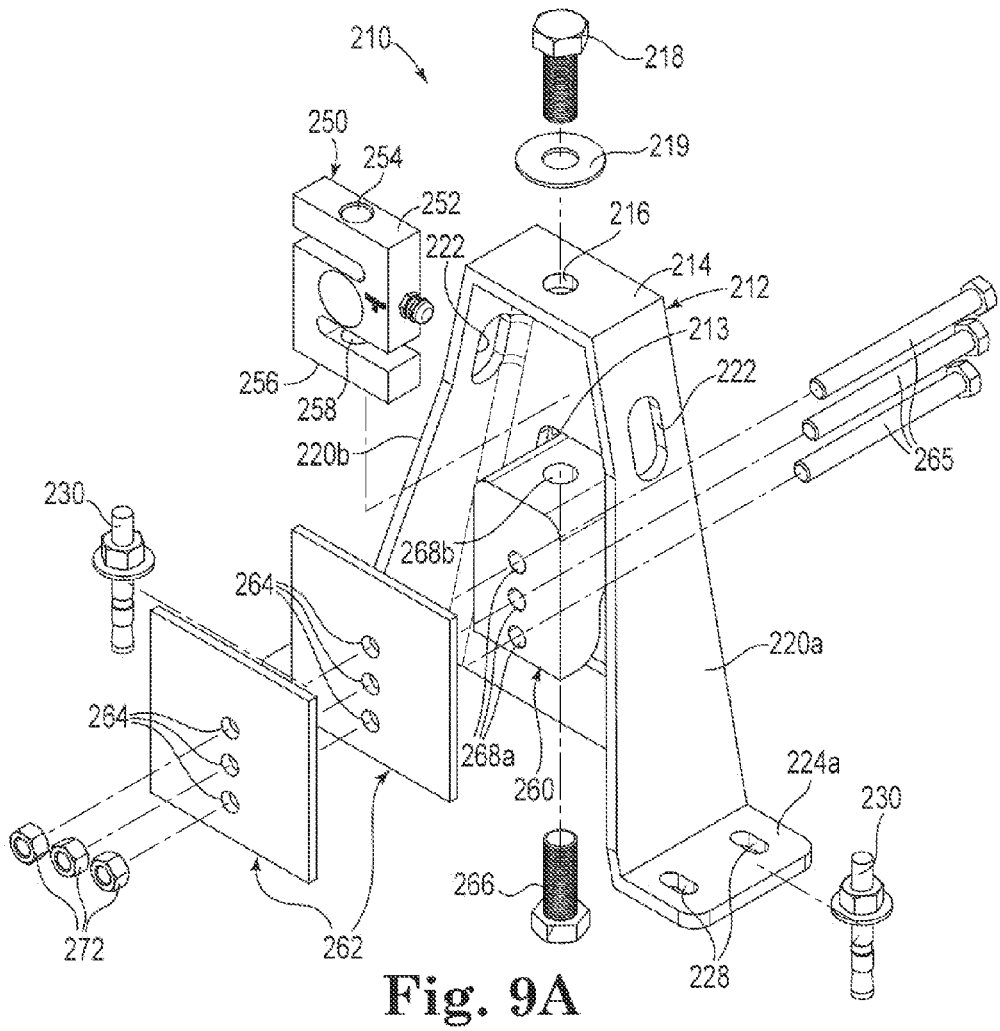
FIG. 9A is an exploded view of an alternate bin monitoring system 210.
Figure 9B:
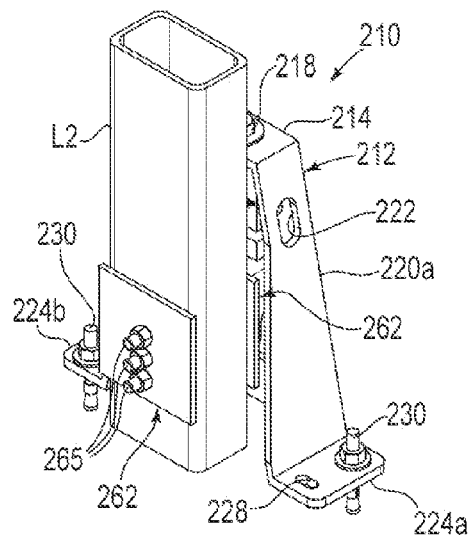
FIG. 9B is a rear view of bin monitoring system 210 of FIG. 9A operatively secured to bin leg L2.

Now also referring to FIGS. 9A-9B, which illustrate another preferred bin monitoring system 210 of the present invention. Bin monitoring system 220 is preferred for bins having rectangular tubular legs L2, as generally illustrated. Preferably, one bin monitoring system 210 is secured to each bin leg L2. The bin monitoring system 220 preferably includes a generally A-shaped frame 212, as in previous embodiments. The preferred frame 212 includes a centrally located aperture 213, a top 214 having an aperture 216 and two supports 220a, 220b extending downwardly and outwardly from the top 214. The frame 212 further preferably includes a base consisting of flanges 224a, 224b, each flange 224a, 224b having at least one aperture 228 for receiving an anchor bolt 230 or the like for securing the frame 212 to a concrete slab C or other foundation.

The bin monitoring system 210 further includes a load cell 250, preferably an S-type load cell, but it will be understood that other types of load cells can be used and are within the spirit and scope of the invention. The load cell 250 includes a first or top end 252 having a top threaded aperture 254 and a bottom or second end 256 having a bottom threaded aperture 258. To secure the load cell 250 to the frame 212, a bolt 218 can be inserted through the aperture 216 in the top 214 of the frame 212 and through the top threaded aperture 254 of the load cell 250. As desired, a washer 219 or the like can be provided to reinforce the top aperture 216 of the frame 212. Each support preferably includes an aperture 222 for threading electrical wiring for the load cell 250 as desired.

Within the aperture 213, a mechanical connector or channel block 260 can be positioned. The channel block 260 illustrated is configured and arranged similarly to mechanical connectors 160, 360, 460, 460', 660, 760 and 860, disclosed herein. The preferred channel block 260 includes at least one side aperture 268a extending through the channel block 260 and a top aperture 268b. The channel block 260 is preferably suspended, in tension, from the bottom 256 of the load cell 250 with a bolt 266 secured within the bottom threaded aperture 258 of the load cell 250 and a top threaded aperture 268b of the channel block 260. Therefore, when bolts 265 are secured through bin leg L2 apertures and into the corresponding bolt apertures 268a of the channel block 260, the load of the bin leg L2, is transferred to the load cell 250 proximate the bottom 256. Similarly to previously discussed embodiments, the channel block 260 and the bin leg L2 can be raised or lowered by rotating bolts 218 or 266.

To support and reinforce the bin leg L2, two plates 262 are preferably provided. Each plate 262 has a plurality of apertures 264 that can be aligned with the side apertures 268a of the channel block 260 so that bolts 265 may pass through the apertures 268a, 264 and be secured within the apertures with nuts 272. Preferably, one plate 262 is positioned on each side of the bin leg L2, as is illustrated.

Preferred use of bin monitoring systems 110 and 210 are generally as follows. First, holes (not shown) are drilled in the leg, proximate the bottom of the leg (see generally (FIGS. 8B, 9B). One bin monitoring system 110, 210, 310 is preferably secured to each leg L1, L2 of a bin, proximate the respective leg such that the holes in the bin leg are aligned with the apertures 168a, 268a in the channel block 160, 260. Then, the bin monitoring system 110, 210 can be secured to the respective bin leg L1, L2 by inserting bolts 165, 265 through the channel block apertures 168a, 268a and into the respective bin leg for securing with nuts 172, 272. In various preferred embodiments, a plate 262 or washers 170 are secured on either side of the bin leg L1, L2 before the bolts 165, 265 are inserted to reinforce the leg apertures. Next, the channel block 160, 260 is raised, either by rotating the bolt 118, 218 or 166, 266 such that the leg is subsequently lifted. As the bin leg L1, L2 is lifted, the load of the bin is transferred to the load cell 150, 250. Preferably, the steps disclosed in this paragraph are repeated until each bin leg has a bin monitoring system operatively connected thereto. The frame 121, 212 flanges 124a, 124b, 224a, 224b can be secured to the foundation with respective anchor bolts 130, 230. The load cell 150, 250 of each bin monitoring system 110, 210 can then be connected to a transmitter to transmit the load data for analysis.

Figure 10A:
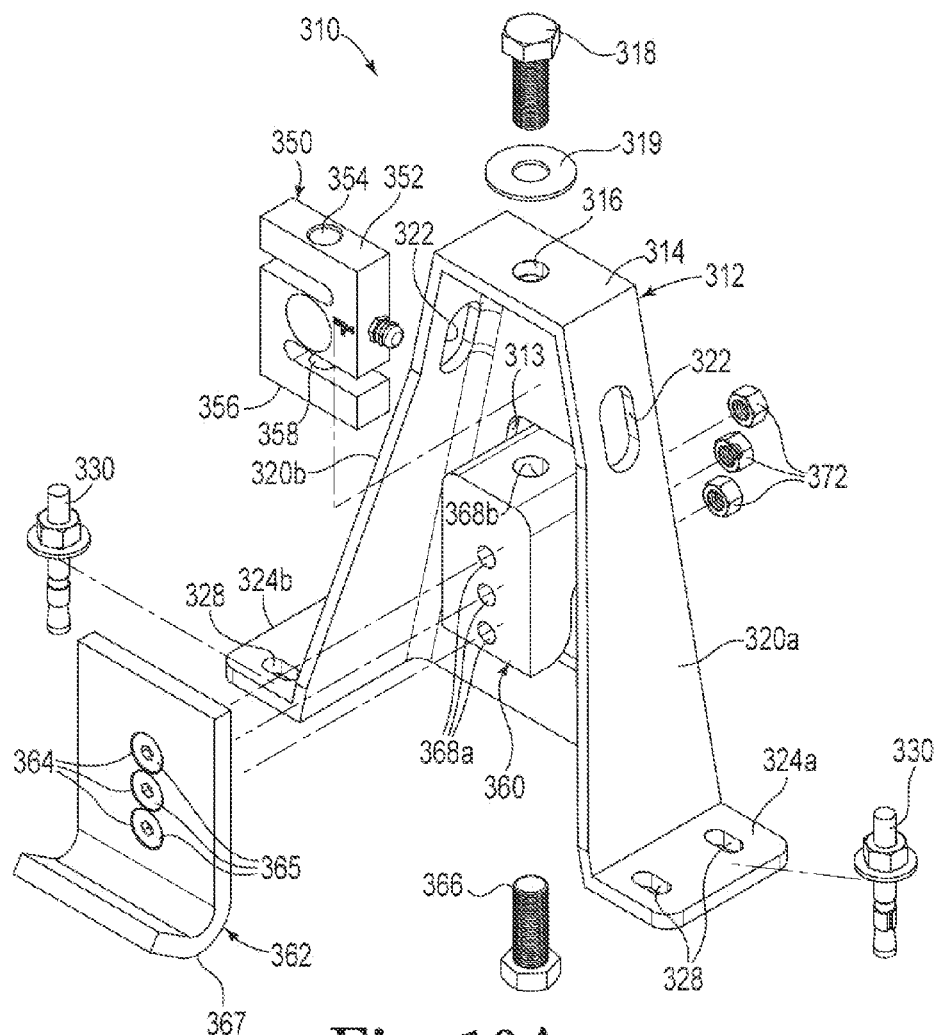
FIG. 10A is an exploded view of a further alternative bin monitoring system 310.
Figure 10B:
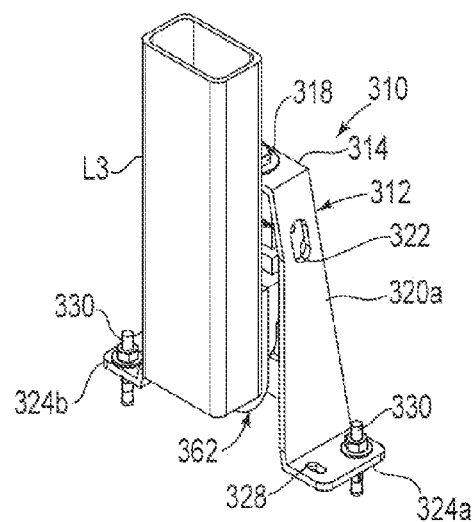
FIG. 10B is a perspective view of the bin monitoring system 301 of FIG. 10A operatively secured to a bin leg L3.

Yet another preferred bin monitoring system 310 is illustrated in FIGS. 10A-10B. The bin monitoring system 310 of FIGS. 10A-10B is preferred for bins having bin legs that are generally rectangular and tubular. Preferably, one bin monitoring system 310 is secured to each bin leg L3. Bin monitoring system 310 preferably includes a generally A-shaped frame 312, similar to previous embodiments. The preferred frame 312 includes a centrally located aperture 313, a top 314 having an aperture 316 and two supports 320a, 320b extending downwardly and outwardly from the top 314. The frame 312 further includes a base consisting of flanges 324a, 324b, each flange 324a, 324b having at least one aperture 328 for receiving an anchor 330 bolt or the like for securing the frame 312 to a concrete slab C or other foundation.

The bin monitoring system 310 further includes a load cell 350, preferably an S-type load cell, but it will be understood that other types of load cells can be used and are within the spirit and scope of the invention. The load cell 350 includes a first or top end 352 having a top threaded aperture 354 and a bottom or second end 356 having a bottom threaded aperture 358. To secure the load cell 350 to the frame 312, a bolt 318 can be inserted through the aperture 316 in the top 314 of the frame 312 and through the top threaded aperture 354 of the load cell 350. As desired, a washer 319 or the like can be provided to reinforce the top aperture or opening 316 of the frame 312. Each support preferably includes an aperture 322 for threading electrical wiring for the load cell 350, as desired.

Within the aperture 313, a mechanical connector or channel block 360 can be positioned. The channel block 360 illustrated is configured and arranged similarly to channel blocks 160, 260, 460, 460', 660, 760 and 860, disclosed herein. The preferred channel block 360 includes at least one side aperture 368a extending through the channel block 360 and a top aperture 368b. The channel block 360 is preferably suspended from the bottom 356 of the load cell 350 with a bolt 366 secured within the bottom aperture 358 of the load cell 350 and a top aperture 368b of the channel block 360. In preferred embodiments, a bracket or adapter 362 is welded to the bin leg L3 such that a hook member 367 of the adapter is positioned under the bin leg L3. It is preferred that the hook member 367 is positioned such that it does not receive any weight of from the bin leg L3 and that the hook member 367 merely be positioned under the leg to catch the leg should the weld between the leg L3 and the adapter 362 weaken. In preferred embodiments, bolts 365 are secured into the corresponding bolt apertures 368a of the channel block 360, such that the load of the bin leg L3 is transferred to the load cell 350 proximate the bottom 356. Similarly to previously discuss embodiments, the channel block 360 and the bin leg L3 can be raised or lowered, for example, by rotating bolts 318 or 366. The adapter plate 362 can be secured to the channel block 360 with bolts 365, which extend through apertures 364 and 368a and can be secured with nuts 372.

The bin monitoring system 310 of FIGS. 10A-10B is operated largely similar to bin monitoring systems 110, 210 with the exception that adapter 362 is preferably welded to the bin leg L3 instead of being bolted on. In addition, as discussed above, the hook member 367 of the adapter 362 is positioned underneath the bin leg L3.

Figure 11A:
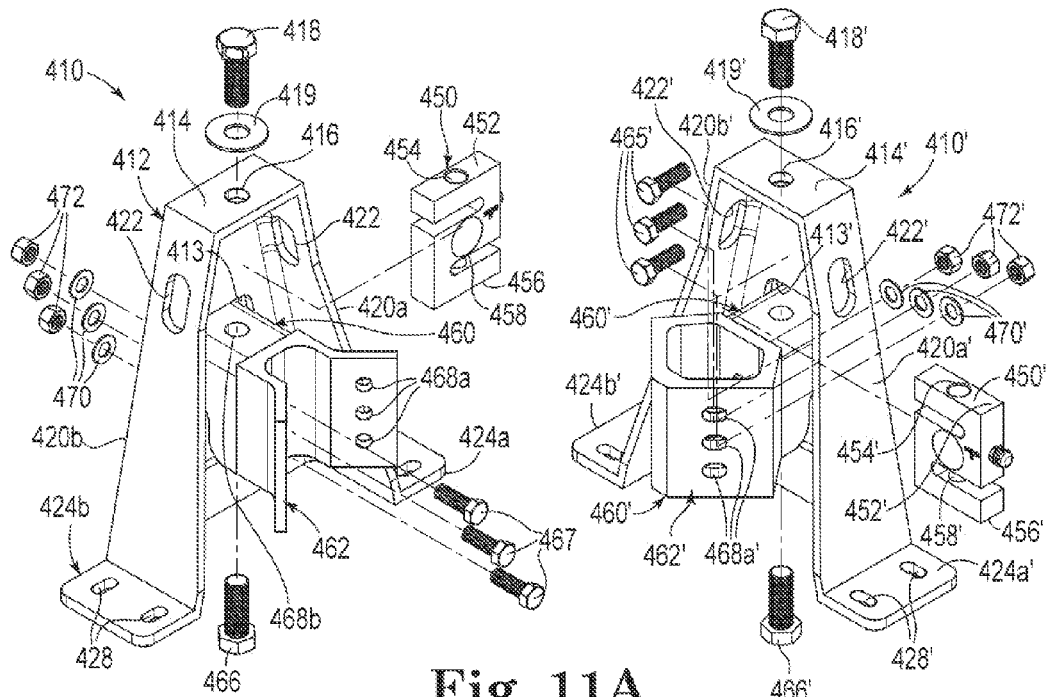
FIG. 11A is partially exploded, perspective view of a set of bin monitoring systems 410, 410'.
Figure 11B:
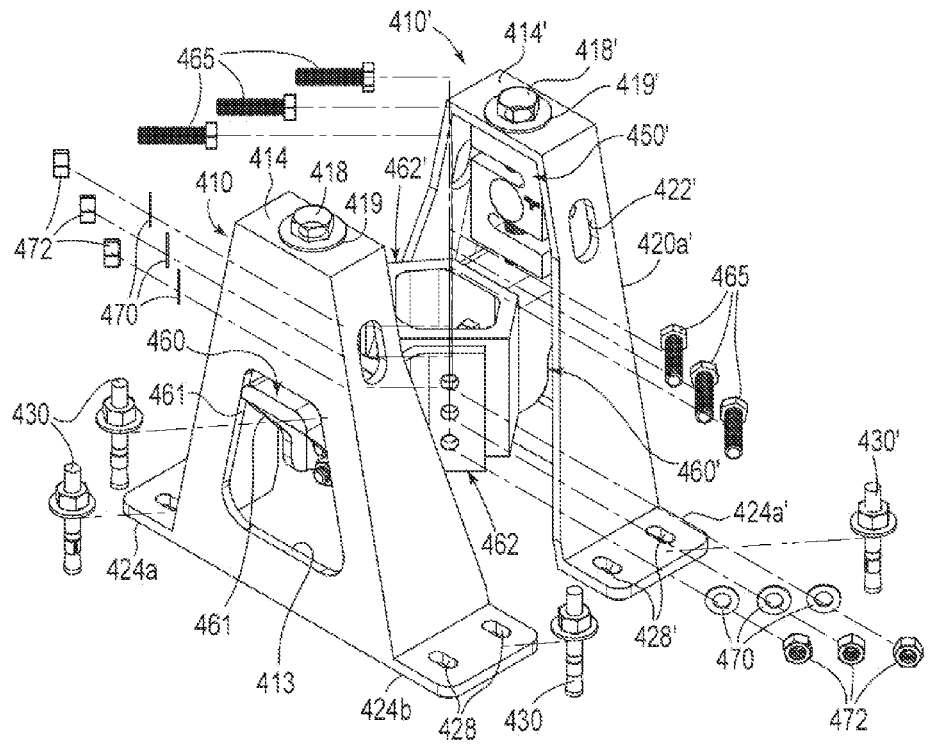
FIG. 11B is a partially exploded, perspective view of the set of bin monitoring systems 410, 410' of FIG. 11A operatively secured to each other.
Figure 11C:
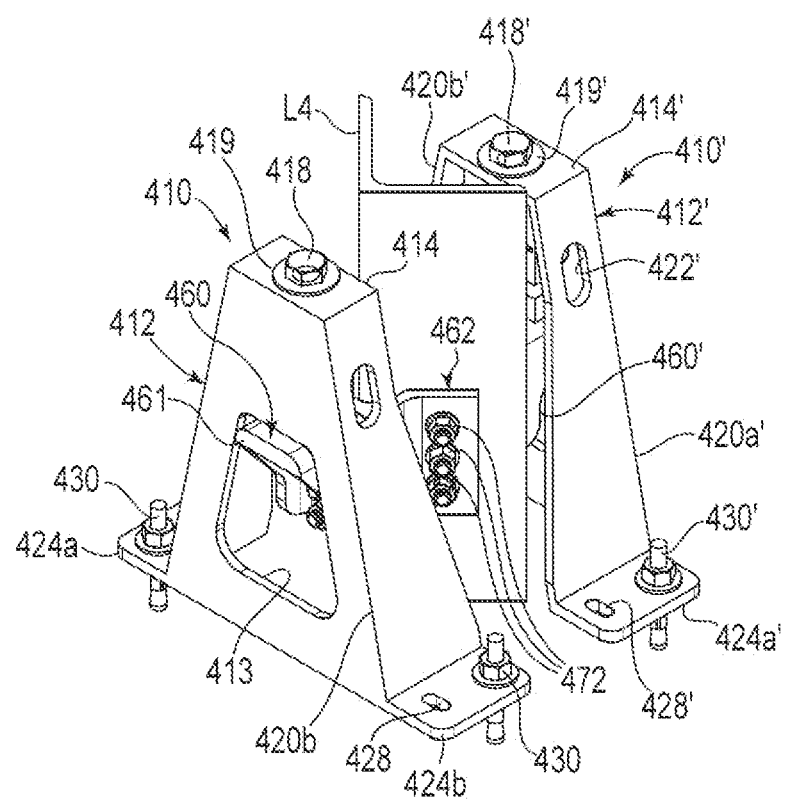
FIG. 11C is a perspective view of the set of bin monitoring systems 410, 410' of FIGS. 11A-11B operatively secured to a bin leg L4.

A set of preferred bin monitoring system 410, 410' are illustrated in FIGS. 11A-11O. The bin monitoring systems 410, 410' of FIGS. 11A-11O are preferred for bins having angle iron legs L4 or the like. Preferably, a set of bin monitoring systems 410, 410' is secured to each bin leg L4. Bin monitoring systems 410, 410' preferably includes two generally A-shaped frames 412, 412'. Each preferred frame 412, 412' includes a centrally located opening or aperture 413, 413', a top 414, 414' having an aperture 416, 416' and two supports 420a, 420b, 420a', 420b' extending downwardly and outwardly from the top 414, 414'. Each frame 412, 414' further includes a base consisting of flanges 424a, 424b, 424a', 424b', each having at least one aperture 428, 428' for receiving an anchor 430, 430' bolt or the like for securing the respective frame 412, 412' to a concrete slab C or other foundation.

Each bin monitoring system 410 further includes a load cell 450, 450', preferably an S-type load cell, but it will be understood that other types of load cells can be used and are within the spirit and scope of the invention. The load cells 450, 450' each include a first or top end 452, 452' having a top threaded aperture 454, 454' and a bottom or second end 456, 456' having a bottom threaded aperture 458, 458'. To secure one load cell 450, 450', to one respective frame 412, 412', a bolt 418, 418' can be inserted through the aperture 416, 416' in the top 414, 414' of the respective frame 412, 412' and through the top threaded aperture 454, 454' of the respective load cell 450, 450'. As desired, a washer 419, 419' or the like can be provided to reinforce the top aperture 416, 416' of the respective frame 412, 412'. Each support 420a, 420b, 420a', 420b' preferably includes an aperture 422, 422' for threading electrical wiring for the respective load cell 450, 450', as desired.

Within the aperture 413, 413' of each frame 412, 412', a mechanical connector or channel block 460, 460' can be positioned. The channel blocks 460, 460' illustrated are configured and arranged similarly to channel blocks 160, 260, 360, 660, 760 and 860, disclosed herein. The preferred channel blocks 460, 460' each include an extension 461, 461', at least one side aperture 468a, 468a' extending through the channel block 460, 460' and a top aperture 468b, 468b'. The extensions 461, 461' function as a limiting device to generally limit the upward distance the channel blocks 460, 460' can be raised with respect to the opening 413, 413'. It will be understood that channel blocks 160, 260, 360, 460, 460', 660, 760 and 860 and frames 12, 112, 212, 312, 412, 412', 512, 612, 712 and 812 are preferably arranged and configured to operate in a similar manner.

Each channel block 460, 460' further includes an adapter 462, 462'. One channel block 460 includes an outside adapter 462 and the other channel block 460' includes a corresponding inside adapter 462'. Each adapter 462, 462' can be secured to the respective channel block 460, 460' with bolts 467, 467' extending through apertures (see also, apertures 168a of FIGS. 15A-15C illustrating a similar channel block 160) in the adapter 462, 462'. The adapters 462, 462' are arranged and configured to generally mate with the angled bin leg L4 and include a plurality of apertures 468a, 468a' that are aligned such that bolts 465, 465' can be inserted through the apertures 468a, 468a' in the adapters 462, 462' and corresponding apertures to be drilled in the bin leg (not shown) to secure the bin monitoring system 410 to the bin leg L4.

Each channel block 460, 460' is preferably suspended from the bottom 456, 456' of the respective load cell 450, 450' with a bolt 466, 466' secured within the bottom aperture 458, 458' of the respective load cell 450, 450' and a top aperture 468b, 468b' of the respective channel block 460, 460'. Therefore, when bolts 465, 465' are secured through bin leg L4 apertures and into the corresponding bolt apertures 468a, 468a' of the respective adapter 462, 462', the load of the bin leg L4, is transferred to the load cells 450, 450' proximate the bottom 456, 456' of each load cell 450, 450'. Similarly to previously discuss embodiments, the channel blocks 460, 460' and the bin leg L4 can be raised or lowered by rotating bolts 418, 418' or 466, 466'.

Figure 12A:
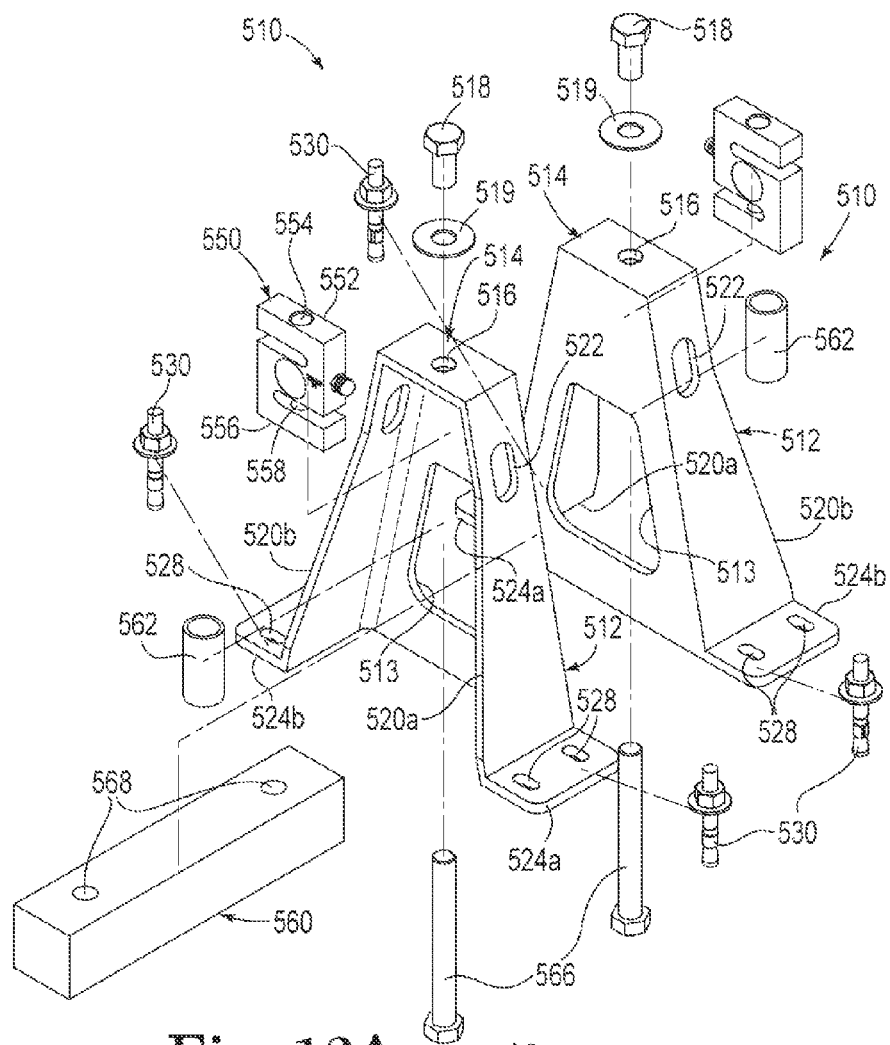
FIG. 12A is an exploded view of a set of bin monitoring systems 510 interconnected by a cross bar 560.
Figure 12B:
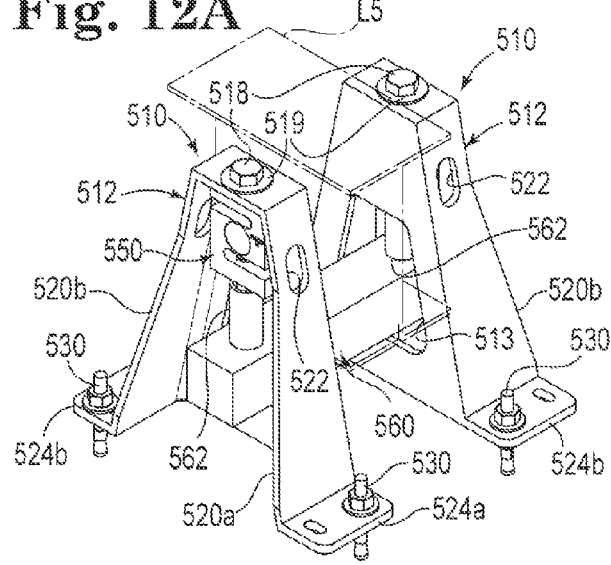
FIG. 12B is a perspective view of the set of bin monitoring systems 510 of FIG. 12A interconnected by the cross bar 560 on which an I-Beam shaped bin leg or the like (not shown) can be positioned.

Preferred, use of bin monitoring systems 410, 410' is generally as follows. First, two sets of holes (not shown) are drilled in the bin leg L4, proximate the bottom of the angle iron leg (see generally, FIG. 11C). Two bin monitoring systems 410, 410' are preferably secured to each leg L4 of a bin, proximate the respective leg such that the holes in the bin leg are aligned with the apertures 468a, 468a' in the respective brackets 462, 462' of each bin monitoring system 410, 410'. Then, the bin monitoring systems 410, 410' can be secured to the respective bin leg L4 by positioning each bin monitoring system such that the adapters 462, 462' are against the bin leg L4. Then, bolts 465 are inserted into the apertures 468a of the outside adapter 462, through corresponding holes in the bin leg L4 and then through the aligned apertures 468a' of the inside adapter 462' to then be secured in place with nuts 472 and washers 470. Next, the channel blocks 460, 460' are raised, either by rotating the bolt 418, 418' or 466, 466' such that the leg L4 is subsequently lifted. As the bin leg L4 is lifted, the load of the bin is transferred to the load cells 450, 450'. Preferably, the steps disclosed in this paragraph are repeated until each bin leg has two corresponding bin monitoring systems operatively connected thereto. The load cells 450, 450' of each bin monitoring system 410, 410' can then be connected to a transmitter to transmit the load data for analysis Another alternative set of bin monitoring systems 510 are illustrated in FIGS. 12A-12B. The set of bin monitoring systems 510 of FIGS. 12A-12B are preferred for use with bins having I-beam shaped legs L5 (shown in phantom) or the like. Preferably, each bin monitoring system 510 has a frame 512, which arranged and configured to be secured to each bin leg L5. The frames 512 are preferably generally A-shaped frames 512, as in previous embodiments. Each frame 512 is preferably generally identical and includes a centrally located aperture or opening 513, a top 514 having an aperture 516 and two supports 520a, 520b extending downwardly and outwardly from the top 514. Each preferred frame 512 further includes a base consisting of flanges 524a, 524b, each flange 524a, 524b having at least one aperture 528 for receiving an anchor 530 bolt or the like for securing the respective frame 512 to a concrete slab C or other foundation.

Each bin monitoring system 510 further includes a load cell 550, preferably an S-type load cell, but it will be understood that other types of load cells can be used and are within the spirit and scope of the invention. Each preferred load cell 550 includes a first or top end 552 having a top threaded aperture 554 and a bottom or second end 556 having a bottom threaded aperture 558. To secure one load cell 550 to each frame 512, a bolt 518 can be inserted through the aperture 516 in the top 514 of the respective frame 512 and through the top threaded aperture 554 of the load cell 550. As desired, a washer 519 or the like can be provided to reinforce the top aperture 516 of each frame 512. Each support 520a, 520b preferably includes an aperture 522 for threading electrical wiring for the load cell 550, as desired.

At least partially positioned within each aperture 513, a mechanical connector or cross bar 560 can be suspended between the two frames 512. The preferred cross bar 560 includes two apertures 568 extending through the cross bar 560 for receiving respective bolts 566 from below. Each bolt 566 extends upwardly through the apertures 568, through mechanical connectors or spacers 562 and up into the respective threaded bottom apertures 558 of the respective load cell 550. Therefore, when the bin leg L5 is positioned on the cross bar 560 between the two frames 512, the load of the bin is applied jointly to the respective bottoms 556 of the two load cells 550. The bin leg L5 and the load cells 550 can be raised or lowered by rotating the respective bolt 518.

Preferred use of bin monitoring systems 510 is generally as follows. First, a bin having an I-beam support base or the like is provided. Then, an I-beam L5 is lifted such that the I-beam is positioned on the cross-bar between two frames 512. As previously discussed, the I-beam L5 and the load cells 550 can be raised or lowered by rotating the respective bolt 518. As the bin leg L5 is lifted, the load of the bin is transferred to the load cells 550. Preferably, the steps disclosed in this paragraph are repeated until each bin leg I-beam has a bin monitoring system operatively connected thereto. Anchor bolts 530 are then used to secure each frame 512 flange or base 524 to the foundation. The load cells 550 of each bin monitoring system 510 can then be connected to a transmitter to transmit the load data for analysis, if desired.

Figure 13A:
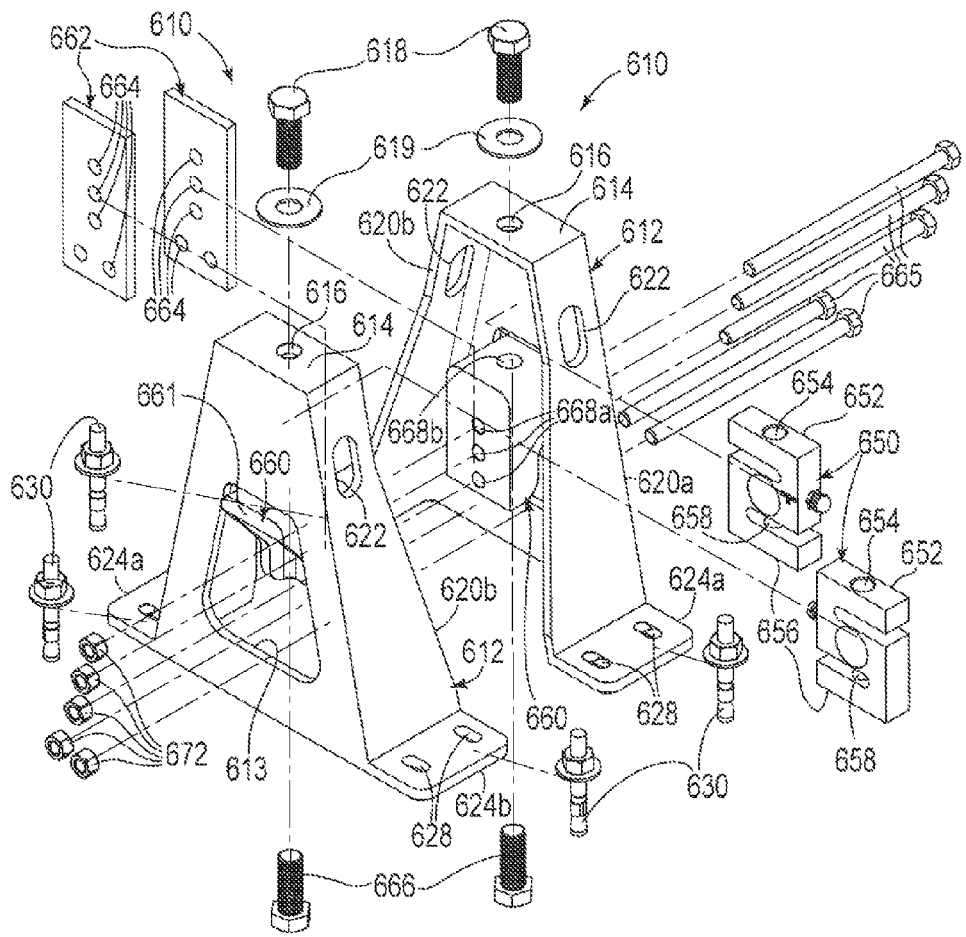
FIG. 13A is a partially exploded view of a set of bin monitoring systems 610.
Figure 13B:
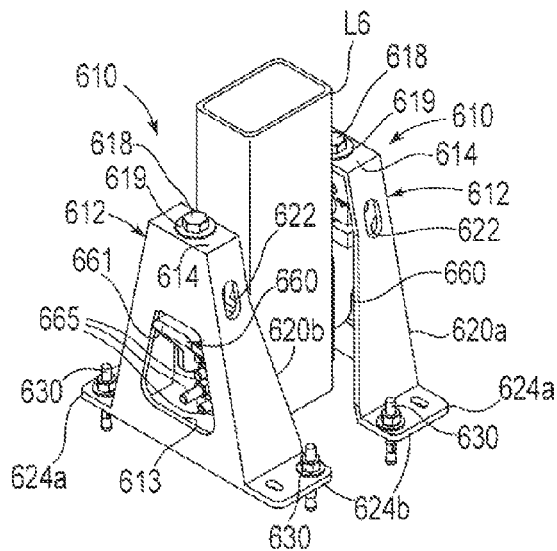
FIG. 13B is a perspective view of the set of bin monitoring systems 610 of FIG. 13A operatively secured to a bin leg L6.

Yet another preferred bin monitoring system 610 is illustrated in FIGS. 13A-13B. The bin monitoring system 610 of FIGS. 13A-13B is preferred for bins having bin legs L6 that are generally rectangular and tubular. Preferably, a set of bin monitoring systems 610 are secured to each bin leg L6. Each preferred frame 612 includes a centrally located aperture 613, a top 614 having an aperture 616 and two supports 620a, 620b extending downwardly and outwardly from the top 614. Each frame 612 further includes a base consisting of flanges 624a, 624b, each flange 624a, 624b having at least one aperture 628 for receiving an anchor 630 bolt or the like for securing the frame 612 to a concrete slab C or other foundation.

Each bin monitoring system 610 includes a load cell 650, preferably an S-type load cell, but it will be understood that other types of load cells can be used and are within the spirit and scope of the invention. Each preferred load cell 650 includes a first or top end 652 having a top threaded aperture 654 and a bottom or second end 656 having a bottom threaded aperture 658. To secure the load cell 650 to the respective frame 612, a bolt 618 can be inserted through the aperture 616 in the top 614 of the frame 612 and through the top threaded aperture 654 of the load cell 650. As desired, a washer 619 or the like can be provided to reinforce the top aperture 616 of the respective frame 612. Each support preferably includes an aperture 622 for threading electrical wiring for the load cell 650, as desired.

Located at least partially within the aperture or opening 613 of each frame, a mechanical connector or channel block 660 can be positioned. Each channel block 660 illustrated is configured and arranged similarly to channel blocks 160, 260, 360, 460, 460', 760 and 860, disclosed herein. Each preferred channel block 660 includes at least one side aperture 668a extending through the channel block 660 and a top aperture 668b. Each channel block 660 is preferably suspended from the bottom 656 of one load cell 650 with a bolt 666 secured within the bottom aperture 658 of the respective load cell 650 and a top aperture 668b of the channel block 660. Therefore, when bolts 665 are secured though the first channel block 660, then through bin leg L6 apertures and into the corresponding bolt apertures 668a of the second channel block 660 and finally secured with nuts 672, the load of the bin leg L6 is transferred to the load cells 650 proximate the bottom 656 of the load cells 650. Similarly to previously discussed embodiments, the channel block 660 and the bin leg L6 can be raised or lowered by rotating bolts 618 or 666.

To further secure the bin monitoring system 610 to the bin leg L6, the bin monitoring system 610 preferably further includes at least one plate 662, preferably two plates 662, each plate 662 having at least one aperture 664 that can be aligned with the aperture(s) 668a of the channel blocks 660. The plates 662 can be secure adjacent opposite sides of the bin leg L6 to reinforce the apertures in the bin leg L6 though which bolts 665 are inserted.

Preferred use of bin monitoring system 610 is generally as follows. First, holes (not shown) are drilled into both sides of a hollow leg, proximate the bottom of the leg (see generally, FIG. 13B). Two bin monitoring systems 610 are preferably secured to each leg L6 of a bin, proximate the respective leg such that the holes in the bin leg are aligned with the apertures 668a in the channel blocks 660. Then, the bin monitoring systems 610 can be secured to the respective bin leg L6 by inserting bolts 665 through the channel block apertures 668a and into the leg for securing with nuts 672. In various preferred embodiments, plates 664 are secured on opposing sides of the bin leg L6 before the bolts 665 are inserted to reinforce the leg apertures. Next, the channel blocks 660 are raised, either by rotating the bolt 618 or 666 such that the leg L6 is subsequently lifted. As the bin leg L6 is lifted, the load of the bin is transferred to the load cells 650. Preferably, the steps disclosed in this paragraph are repeated until each bin leg has a set of bin monitoring systems 610 operatively connected thereto. The frame 612 flanges 624a, 624b can be secured to the foundation with respective anchor bolts 630. The load cell 650 of each bin monitoring system 610 can then be connected to a transmitter to transmit the load data for analysis, as desired.

Figure 14A:
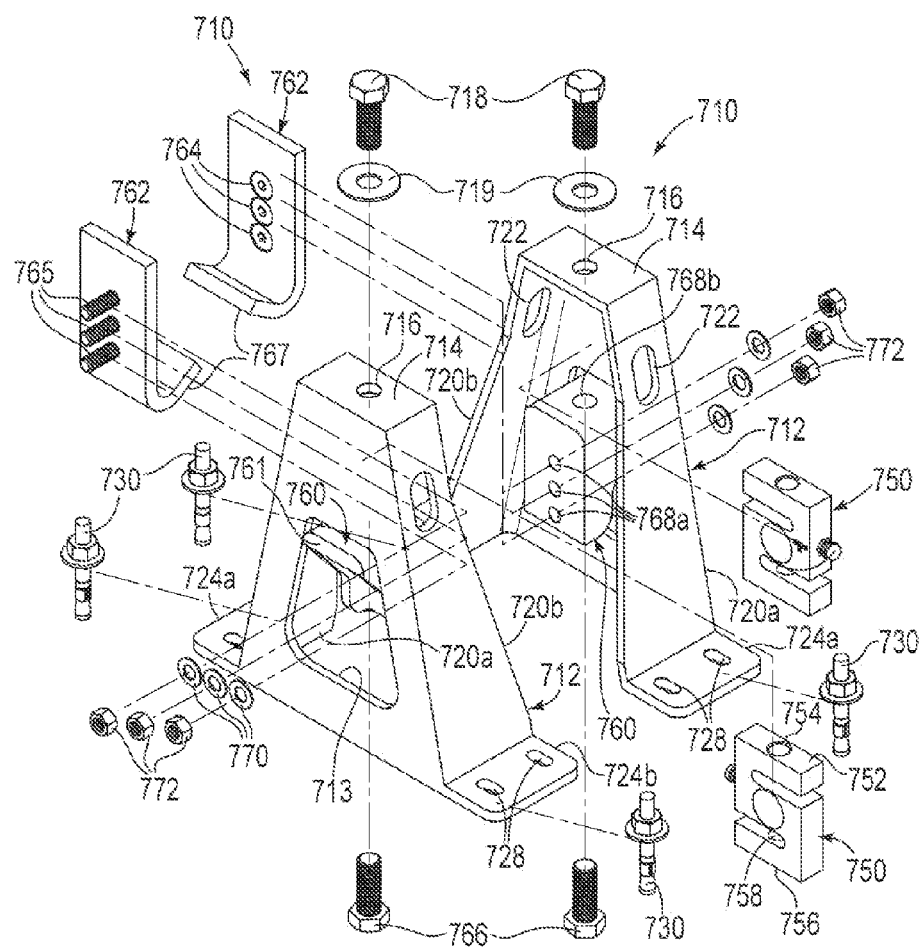
FIG. 14A is a partially exploded view of a set of bin monitoring systems 710.
Figure 14B:
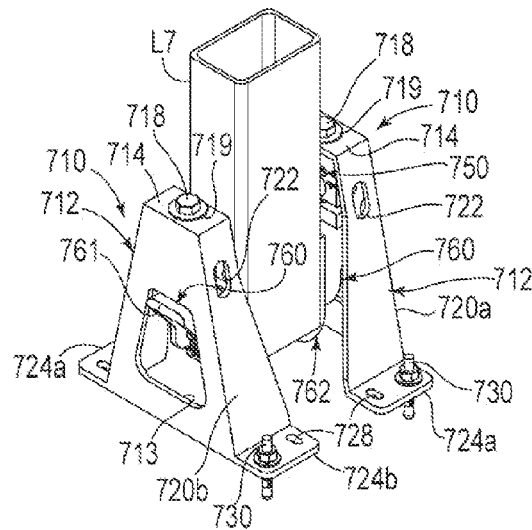
FIG. 14B is a perspective view of the set of bin monitoring systems 710 of FIG. 14A operatively secured to a bin leg L7.

A further bin monitoring system 710 is illustrated in FIGS. 14A-14B. The bin monitoring system 710 of FIGS. 14A-14B is preferred for bins having bin legs L7 that are rectangular and tubular. Bin monitoring system 710 preferably includes two generally A-shaped frames 712, as in various previously discussed embodiments. Each preferred frame 712 includes a centrally located aperture or opening 713, a top 714 having an aperture 716 and two supports 720a, 720b extending downwardly and outwardly from the top 714. Each frame 712 further includes a base comprising two flanges 724a, 724b, each flange 724a, 724b having at least one aperture 728 for receiving an anchor 730 bolt or the like for securing the respective frame 712 to a concrete slab C or other foundation (see also, FIGS. 1C and 6).

Each bin monitoring system 710 further includes a load cell 750, preferably an S-type load cell, but it will be understood that other types of load cells can be used and are within the spirit and scope of the invention. Each load cell 750 includes a first or top end 752 having a top threaded aperture 754 and a bottom or second end 756 having a bottom threaded aperture 758. To secure each load cell 750 to the respective frame 712, a bolt 718 can be inserted through the aperture 716 in the top 714 of the frame 712 and through the top threaded aperture 754 of the load cell 750. As desired, a washer 719 or the like can be provided to reinforce the top aperture 716 of the respective frame 712. Each support preferably includes an aperture 722 for threading electrical wiring for the load cell 750, as desired.

Located at last partially within each aperture 713, a mechanical connector or channel block 760 is positioned. The channel block 760 illustrated is configured and arranged similarly to channel blocks 160, 260, 360, 460, 460', 660 and 860, disclosed herein. Each preferred channel block 760 includes at least one side aperture 768a extending through the channel block 760 and a top aperture 768b. Each channel block 760 is preferably suspended from the bottom 756 of the respective load cell 750 with a bolt 766 secured within the bottom aperture 758 of the load cell 750 and a top aperture 768b of the channel block 760. To secure each frame 712 to the bin leg L7, the bin monitoring system 710 preferably further includes adapter plates or brackets 762 having at least one aperture 764 aligned with the aperture(s) 768a of the respective channel blocks 760 and a hook member 767. As illustrated, each hook member 767 is preferably slid under and engaged with the bin leg L7 such that it is proximate the end of the bin leg L7 but is not supporting the bin leg. The adapter plates 762 can be secured to the respective channel blocks 760 by with bolts 765 inserted through apertures 764, for example.

Therefore, when adapter plates 762 are secured to the bin leg L7, preferably by welding, the load of the bin leg L7, is transferred to the load cells 750 proximate the bottom 756. Similar to previously discuss embodiments, the respective channel block 760 and the respective bin leg L7 can be raised or lowered by rotating bolts 718 or 766.

Use of bin monitoring systems 710 are generally as follows. First, one bin monitoring system 710 is preferably secured to each opposing ends of leg L7 of a bin, preferably by welding. Then, bolts 765 can be secured within channel block apertures 768a and secured with washers 770 and nuts 772. Next, each channel block 760 is raised, either by rotating the bolt 718 or 766 such that the leg is subsequently lifted. As the bin leg L7 is lifted, the load of the bin is transferred to the load cells 750. In further preferred embodiments, an adapter plate 762 is secured to each channel block 760, either by bolting or welding, such that when the bin leg L7 is lifted, the hook 767 of the adapter plate 762 is below the respective leg L7. In preferred embodiments, the hook 767 is below the leg but does not support the leg L7. The hook 767 is preferably arranged such that the hook will support the leg only if the weld between the adapter plate 762 and the bin leg is weakened or fails. Preferably, the steps disclosed in this paragraph are repeated until each bin leg has a set of bin monitoring systems operatively connected thereto. The frame 712 flanges 724a, 724b can be secured to the foundation with respective anchor bolts 730. The load cell 750 of each bin monitoring system 710 can then be connected to a transmitter to transmit the load data for analysis.

Yet another preferred bin monitoring system 810 having a different adapter set of plates or brackets 862, 862' is illustrated in FIGS. 16A-16C. This embodiment is largely similar to that of FIGS. 9A-9B in that the frame 812, load cell 850 and mechanical connector 860, among other identical elements, are all similarly configured and arranged. For bin legs L8 that are generally cylindrical, first and second adapter plates or brackets 862, 862' are preferred. In this embodiment, the first adapter plate 862 is preferably connected to mechanical connector 860 with bolts 865 and nuts 872. The adapter plate 862 further includes a plurality of apertures 864 that are aligned with apertures 864' in the second bracket 862' such that the first bracket and second brackets 862' can be secured around the bin leg L8 with bolts 867. To further connect brackets 862, 862' and the mechanical connector to the leg L8, two additional bolts (not shown) can be secured through apertures 864" and into corresponding apertures A drilled in the bin leg L8 such that the bin leg L8 can be raised and lowered by raising or lowering mechanical connector 860 as discussed herein with respect to other similar embodiments.

Preferred use of bin monitoring system 810 is generally as follows. First, holes or apertures A are drilled in the leg L8, proximate the bottom of the leg. One bin monitoring system 810 is preferably secured to each leg L8 of a bin, proximate the respective leg such that the apertures A drilled in the bin leg L8 are aligned with the apertures 864" in the adapter plate 862'. Then, the bin monitoring system 810 can be secured to the respective bin leg L8 by securing the channel block 860 to the adapter bracket 862 and the securing the second adapter bracket 862' to the first adapter bracket 862. The leg L8 is preferably secured to the second adapter bracket 862' by inserting a bolt (not shown) into apertures 864" and A. Next, the channel block 860 is raised, either by rotating bolt 818 or 866 such that the leg is subsequently lifted. As the bin leg L8 is lifted, the load of the bin is transferred to the load cell 850. Preferably, the steps disclosed in this paragraph are repeated until each bin leg has a bin monitoring system operatively connected thereto and the bin legs are suspended off of the foundation. The frame 812 can be secured to the foundation in accordance with methods disclosed herein with respect to other embodiments. The load cell 850 of each bin monitoring system 810 can then be connected to a transmitter to transmit the load data for analysis.

As described above, the bin monitoring system 10, 10', 110, 210, 310, 410, 410', 510, 610, 710 and 810 can be used to determine how much feed enters and exits a feed bin. In this way, the bin monitoring system 10 facilitates the determination of when more feed should be ordered. In addition, the bin monitoring system 10 facilitates verifying how much feed is actually delivered when the bins are refilled and how much is being consumed. As a result, potential out-of-feed events can be monitored, animal performance based on feed consumption can be correlated, and future bin levels can be predicted accurately.

As demonstrated by the foregoing discussion, various embodiments may provide certain benefits. For instance, the bin monitoring system 10, 10' 110, 210, 310, 410, 410', 510, 610, 710 and 810 can greatly reduce monitoring costs. The required labor can be reduced because multiple bin feed levels can be quickly, simultaneously, and accurately monitored at a central location, as compared with the conventional approach of visually inspecting each bin individually. Safety hazards can also be reduced because workers do not need to climb feed bins to inspect them.

Additionally, logistical savings can be realized by the bin monitoring systems 10, 10', 110, 210, 310, 410, 410', 510, 610, 710 and 810. Typically, feed mills have large demands on Mondays and Fridays. On these days, the mills run over capacity and often need to pay overtime to drivers and milling employees to fill tanks for the weekend or to catch up on empty tanks on Mondays. On Tuesdays, Wednesdays, and Thursdays, the mills run under capacity. Use of the bin monitoring systems 10, 110, 210, 310, 410, 410', 510, 610, 710 and 810 allow the feed mill to level its production flow out over the week by delivering feed early to some bins and just-in-time to others. Accurate monitoring of feed bins allows producers to better predict and schedule when they will need to replenish the feed bins, which in turn will reduce the amount of expedited orders and allow the feed mill to plan their production. By allowing the feed mill to better plan its production, the feed mill can schedule the bottlenecks to the maximum increasing throughput. Overtime is saved in both the feed mill and the trucking, and the incidence of empty compartments or "air tons" can be reduced. Rush orders can be eliminated by better planning, thus greatly reducing the frequency of expedited orders and the associated expense.

It is further believed that bin monitoring systems utilizing two frames 412, 412', 512, 612, 712 are preferred as the load is applied more evenly on the load cell and is not offset as compared to other embodiments. It is believed that such embodiments, for example, the embodiments of FIGS. 11A-14B provide more accurate measurements.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A bin monitoring system useable with a bin having a weight and a plurality of bin legs that support the bin above a foundation, each bin leg having a bottom, the bin monitoring system comprising:
    a frame having a base, the base configured to be securable to the foundation adjacent a bin leg;
    a load cell secured above the base and suspended in tension from the frame, the load cell being operatively positioned to have the weight of the bin applied to the load cell; and
    a mechanical connector attached to the load cell and attachable to the adjacent bin leg and constructed and arranged to suspend the bottom of the bin leg at an elevation below the load cell.

2. The bin monitoring system of claim 1, wherein the load cell is an S-type load cell.

3. The bin monitoring system of claim 1, wherein the mechanical connector includes bolts for attaching the mechanical connector to the bin leg.

4. The bin monitoring system of claim 1, wherein the frame includes a top surface that is horizontally oriented when the frame is secured to the foundation, wherein the load cell is connected to the top surface.

5. The bin monitoring system of claim 4, wherein the load cell is suspended in tension from the top surface.

6. A bin monitoring system for measuring the weight of a bin having a plurality of legs, the bin monitoring system comprising:
    a frame having an opening;
    a mechanical connector positioned at least partially within the opening; wherein the mechanical connector can be secured to one bin leg adjacent the respective bin leg; and
    a load cell having an upper end and a lower end, the load cell being connected to the frame and the mechanical connector such that the load cell is in tension;
    wherein the mechanical connector can be attached to the adjacent bin leg to raise the adjacent bin leg above the foundation and apply the bin weight to the lower end of the load cell when the load cell is raised.

7. The bin monitoring system of claim 6, wherein the mechanical connector includes an extension that protrudes out of the frame opening and can limit the upward movement of the mechanical connector.

8. The bin monitoring system of claim 6, wherein the frame includes a top having a top aperture, wherein a bolt extending through the top aperture is secured to the top of the load cell to suspend the load cell from the top of the frame.

9. The bin monitoring system of claim 8, wherein the bolt can be rotated to raise the load cell and the mechanical connector, thus lifting the bin leg to which the mechanical connector is connected.

10. The bin monitoring system of claim 6, further comprising an adapter plate that is secured to the mechanical connector; wherein the adapter plate can engage the bottom of the bin leg.

11. The bin monitoring system of claim 10, wherein the adapter plate includes a hook, wherein the hook engages the bottom of the bin leg.

12. The bin monitoring system of claim 6, wherein the frame is generally A-shaped.

13. A bin monitoring system for measuring the weight of a bin having a plurality of legs, the bin monitoring system comprising:
    a bracket; wherein the bracket is securable to a bin leg and can raise the bin leg off of the ground;

a load cell; wherein the load cell is suspended from the bracket and measures the weight of the bin; wherein the bin leg can be positioned at least partially below the load cell; and a frame; wherein the frame is interconnected to the bracket and the load cell; wherein the frame can secure the bin monitoring system to a foundation.

14. The bin monitoring system of claim 13, wherein the bracket is secured to the bin leg with nuts and bolts.

15. The bin monitoring system of claim 13, wherein the load cell is suspended from the frame and is in tension.

16. The bin monitoring system of claim 13, wherein the frame includes a top surface that is horizontally oriented when the frame is secured to the foundation, wherein the load cell is connected to the top surface.

17. The bin monitoring system of claim 13, wherein the frame includes a top having a top aperture, wherein a bolt extending through the top aperture is secured to the top of the load cell to suspend the load cell from the top of the frame; wherein the bolt can be rotated to raise the load cell, thus lifting the bin leg to which the bracket is secured.

18. A set of bin monitoring systems for measuring the weight of a bin having a plurality of legs, the bin monitoring systems comprising:

a set of frames, each frame having:
    an opening;
    a mechanical connector at least partially located within the frame opening; and
    a load cell having a top and a bottom; the top connected to one respective frame and the mechanical connector is connected to the bottom;
wherein each mechanical connector can be secured to the same adjacent bin leg such that the adjacent bin leg is positioned above the ground but below the mechanical connectors; wherein the weight of the bin is applied to each load cell proximate the bottom of the load cell.

19. The set of bin monitoring systems of claim 18, wherein one channel block includes an inside adapter and the second mechanical connector includes an outside adapter; wherein the inside adapter and the outside adapter can be secured to opposite sides of the bin leg to secure the set of frames to the bin leg.

20. The set of bin monitoring systems of claim 18, wherein each mechanical connector includes an extension that protrudes out of the respective frame opening as to limit the upward movement of the respective mechanical connector.

21. The set of bin monitoring systems of claim 18, wherein each frame includes a top having a top aperture, wherein a bolt extending through the top aperture is secured to the top of the load cell to suspend the respective load cell from the top of the respective frame.

22. The set of bin monitoring systems of claim 21, wherein each bolt can be rotated to raise the respective load cell and the respective mechanical connector to which the bolt is secured, thus lifting the bin leg.

23. The set of bin monitoring systems of claim 18, further comprising at least one set of adapter plates that are secured to one mechanical connector; wherein each adapter plate can engage the bottom of the bin leg.

24. The set of bin monitoring systems of claim 23, wherein the adapter plates each include a hook, wherein the hook engages the bottom of the bin leg.

25. The set of bin monitoring systems of claim 18, wherein each frame is generally A-shaped.

26. The set of bin monitoring systems of claim 18, wherein the bin monitoring systems can be interconnected by at least one bolt extending through the channel blocks and the bin leg.

27. A set of bin monitoring systems for measuring the weight of a bin having a plurality of legs, the bin monitoring systems comprising:

a set of frames, each frame having an opening;
a cross bar at least partially positioned within the openings; wherein the cross bar is arranged and configured such that a bin leg can be positioned on the cross bar in between the frames; and
a set of load cells each having a top and a bottom; the top connected to the respective frame and the respective cross bar is interconnected to the bottom;
wherein the cross bar can be raised to subsequently raise the bin leg and thus, apply a load to the set of load cells proximate the respective bottoms of the load cells.

28. The set of bin monitoring systems of claim 27, wherein each frame includes a top having a top aperture, wherein a bolt extending through the top aperture is secured to the top of the load cell to suspend the respective load cell from the top of the respective frame.

29. The set of bin monitoring systems of claim 27, wherein each bolt can be rotated to raise the respective load cell and the respective mechanical connector to which the bolt is secured, thus lifting the bin leg.

30. The set of bin monitoring systems of claim 27, wherein each frame is generally A-shaped.

31. The set of bin monitoring systems of claim 27, wherein the top of each frame is generally parallel to the cross bar.

32. The set of bin monitoring systems of claim 27, wherein the load cell is transverse with respect to the cross bar.

33. A set of bin monitoring systems for measuring the weight of a bin having a plurality of legs, each leg having two opposing sides, the bin monitoring systems comprising:

a set of frames securable to the foundation adjacent a bin leg; each frame including:
a load cell carried by the frame and operatively positioned to have the weight of the bin applied to the load cell; and
a mechanical connector attached to the load cell and attachable to the adjacent bin leg and constructed and arranged to suspend the bottom of the bin leg at an elevation below the load cell.

34. The set of bin monitoring systems of claim 33, each frame having an opening in which the mechanical connector is at least partially positioned.

35. The set of bin monitoring systems of claim 33, wherein one frame is secured to one of the two opposing sides and the other frame is secured to the second opposing side.

36. The set of bin monitoring systems of claim 35, further comprising a cross bar; wherein the cross bar is arranged and configured such that a bin leg can be positioned on the cross bar in between the frames.

37. The set of bin monitoring systems of claim 36, wherein the load cell has a top end and a bottom end; wherein the cross bar can be raised to subsequently raise the bin leg and thus, apply a load to the set of load cells proximate the respective bottom ends of the load cells.

* * * * *